United States Patent [19]

Shimasaki et al.

[11] Patent Number: 5,287,836
[45] Date of Patent: Feb. 22, 1994

[54] CONTROL SYSTEM FOR INTERNAL COMBUSTION ENGINES

[75] Inventors: Yuichi Shimasaki; Masaki Kanehiro; Takuji Ishioka; Shigeki Baba; Takashi Hisaki; Shigeru Maruyama; Masataka Chikamatsu; Shukoh Terata; Kenichi Maeda; Kazuhito Kakimoto, all of Wako, Japan

[73] Assignee: Honda Giken Kogyo Kabushiki Kaisha, Tokyo, Japan

[21] Appl. No.: 992,195

[22] Filed: Dec. 17, 1992

[30] Foreign Application Priority Data

Dec. 18, 1991 [JP] Japan ................................. 3-353841
Dec. 25, 1991 [JP] Japan ................................. 3-357067

[51] Int. Cl.$^5$ ............................. F02P 5/00; F02P 5/14
[52] U.S. Cl. ....................................... 123/406; 123/425
[58] Field of Search ...................... 123/406, 419, 425; 324/399; 364/431.08

[56] References Cited

U.S. PATENT DOCUMENTS

| | | | |
|---|---|---|---|
| 3,952,715 | 4/1976 | Van Siclen, Jr. | 123/406 |
| 3,996,911 | 12/1976 | Canup | 123/406 |
| 4,315,492 | 2/1982 | Gardner | 123/406 |
| 4,884,206 | 11/1989 | Mate | 123/419 |
| 5,078,112 | 1/1992 | Ikeura | 123/406 |
| 5,146,893 | 9/1992 | Ohsawa | 123/425 |
| 5,180,984 | 1/1993 | Murata et al. | 324/399 |
| 5,189,373 | 2/1993 | Murata et al. | 324/399 |

FOREIGN PATENT DOCUMENTS 62-38853 2/1987 Japan.

Primary Examiner—Raymond A. Nelli
Attorney, Agent, or Firm—Nikaido, Marmelstein, Murray & Oram

[57] ABSTRACT

A control system for an internal combustion engine determines ignition timing of the engine and generates an ignition command signal to generate high voltage for discharging a spark plug provided for each cylinder of the engine. The control system detects sparking voltage generated across the spark plug when the high voltage is generated. The control system measures a duration over which the sparking voltage across the spark plug exceeds a predetermined reference value, after generation of the ignition command signal. According to a first aspect of the invention, the control system detects combustion roughness based on the duration measured. According to a second aspect of the invention, the control means detects an air-fuel ratio of an air-fuel mixture supplied to the engine, based on the duration measured.

6 Claims, 16 Drawing Sheets

CONTROL SYSTEM FOR INTERNAL COMBUSTION ENGINES

BACKGROUND OF THE INVENTION

1. Field of the Invention

This invention relates to a control system for internal combustion engines, and more particularly to a control system of this kind, which is adapted to control the operation of an internal combustion engine by monitoring the state of combustion of an air-fuel mixture supplied to the cylinders of the engine and using the detected combustion state as a parameter for controlling the operation of the engine.

2. Prior Art

The state of combustion of the mixture in a cylinder of the engine can be rpresented, when the engine is in a steady operating condition, for example, by a ratio $\Delta Pmax/Pmaxave$ (hereinafter referred to as "combustion roughness") which is the ratio of an amount of variation $\Delta Pmax$ of the maximum value (combustion pressure value) Pmax of pressure within a cylinder to an average value Pmaxave of the maximum value Pmax. The combustion roughness $\Delta Pmax/Pmaxave$ assumes a larger value as the state of combustion is worse.

A control system for internal combustion engines is conventionally known e.g. from Japanese Provisional Patent Publication (Kokai) No. 62-38853, which comprises a combustion roughness detector for detecting the combustion roughness by means of a combustion pressure sensor or a combustion light sensor, an air-fuel ratio sensor, and an engine control unit for controlling the ignition timing, air-fuel ratio, etc, of the engine, wherein if the combustion of a mixture in an engine cylinder becomes worse, a fuel injection amount value, an ignition timing advance value, etc. read from respective maps stored in a ROM within the engine control unit are corrected based on a signal from the combustion roughness detector.

On the other hand, oxygen concentration sensors are widely used, which are arranged in the exhaust systems of internal cumbustion engines for detecting the air-fuel ratio of a mixture supplied to the engine. Further, in recent years, there is also used a linear output type oxygen concentration sensor which is capable of detecting the air-fuel ratio A/F not only in the vicinity of a stoichiometric ratio (A/F=14.7) but also over a wider range (e.g. a range of A/F from 8 to 24).

Further, exhaust gas recirculation systems are also widely used in internal combustion engines, for recirculating exhaust gases to the intake system.

However, the combustion pressure sensor and the combustion light sensor mentioned above are very expensive. Moreover, such a sensor has to be provided for each cylinder, and hence the total cost of the control system including the combustion roughness detector becomes considerably high. Therefore, the proposed system cannot be employed in engines in general such as engines for ordinary passenger cars, excepting engines for special applications.

Further, when the engine is operating in a vehicle-cruising condition or an idling condition, which frequently occurs in actual traveling of a vehicle on which the engine is installed, load on the engine is low, and hence the combustion pressure and the combustion light are so weak that it is impossible to accurately detect the combustion roughness by means of the combustion pressure sensor or the combustion light sensor. In particular, when the engine is in a high rotational speed and low load condition, it is quite impossible to obtain reliable results of detection for achieving the intended control of the engine.

Further, in detecting the actual ignition timing and comparing a detected value thereof with a command value supplied to an ignition timing control system for optimum ignition timing control, the combustion pressure sensor is unable to detect the actual ignition timing, which necessitates using both the combustion pressure sensor and the combustion light sensor.

Further, the combustion light sensor, even if formed of a quartz glass optical fiber, has a low durability such that an output therefrom decreases due to aging or deposition of carbon and combustion products on the sensor. Therefore, the combustion light sensor cannot be reliably used for engine control in view of its short service life.

Further, since the conventional linear output type oxygen concentration sensor is complicated in construction and hence expensive, the use of the sesor forms a significant factor for increasing the cost, particularly for detecting the air-fuel ratio of a mixture supplied to each cylinder. Therefore, there is a strong demand for an inexpensive air-fuel ratio sensor having a simpler construction.

Further, the exhaust gas recirculation system is required to control the amount or rate of recirculation of exhaust gases to values suitable for operting conditions of the engine. However, conventional recirculation amount sensors such as an EGR control valve lift sensor do not exhibit fully satisfactory accuracy of detection of an actual amount or rate of exhaust gas recirculation, so that the accuracy of control of the amount or rate of exhaust gas recirculation remains to be improved.

SUMMARY OF THE INVENTION

It is a first object of the invention to provide a control system for an internal combustion engine, which is capable of more accurately detecting the combustion roughness of the engine in a simple and inexpensive manner and using the detected combustion roughness as a parameter for controlling the engine.

It is a second object of the invention to provide a control system which is capable of detecting the air-fuel ratio of a mixture supplied to the engine in a simple and inexpensive manner.

It is a third object of the invention to provide a control system for an internal combustion engine provided with an exhaust gas recirculation system, which is capable of accurately controlling the amount or rate of exhaust gases recirculated to the intake system of the engine.

To attain the above objects, the present invention provides a control system for an internal combustion engine having at least one cylinder, and a spark plug provied for each of the at least one cylinder, the control system including control means for controlling operation of the engine, the control means including signal-generating means for determining ignition timing of the engine and for generating an ignition command signal indicative of the determined ignition timing, and igniting means responsive to the ignition command signal for generating high voltage for causing generation of sparking voltage across the at least one spark plug.

According to a first aspect of the invention, the control system is characterized by comprising:

voltage value-detecting means for detecting the sparking voltage generated across the at least one spark plug when the high voltage is generated;

duration-measuring means for measuring a duration over which the sparking voltage across the spark plug exceeds a predetermined reference value, after generation of the ignition command signal; and combustion roughness-detecting means for detecting combustion roughness based on the duration measured.

The control means controls the operation of the engine based on the detected combustion roughness.

Preferably, the control means controls at least one of an amount of fuel supplied to the engine and ignition timing of the engine, based on the detected combustion roughness.

The engine may include an intake system, and an exhaust gas recirculation system for recirculating exhaust gases from the engine to the intake system. Then, particularly to attain the third object of the invention, it is preferred that the control means controls an amount of exhaust gases recirculated by the exhaust gas recirculation system, based on the detected combustion roughness.

More preferably, the engine includes a plurality of cylinders, and the control means controls at least one of an amount of fuel supplied to the engine and ignition timing of the engine, for each of the cylinders, based on the detected combustion roughness.

According to a second aspect of the invention, particularly to attain the second object of the invention, the control system is characterized by comprising:

voltage value-detecting means for detecting the sparking voltage generated across the at least one spark plug when the high voltage is generated;

duration-measuring means for measuring a duration over which the sparking voltage across the spark plug exceeds a predetermined reference value, after generation of the ignition command signal; and air-fuel ratio-detecting means for detecting an air-fuel ratio of an air-fuel mixture supplied to the engine, based on the duration measured.

The above and other objects, features, and advantages of the invention will become more apparent from the ensuing detailed description taken in conjunction with the accompanying drawings.

DETAILED DESCRIPTION

The invention will now be described in detail with reference to the drawings showing embodiments thereof.

Figure 1:
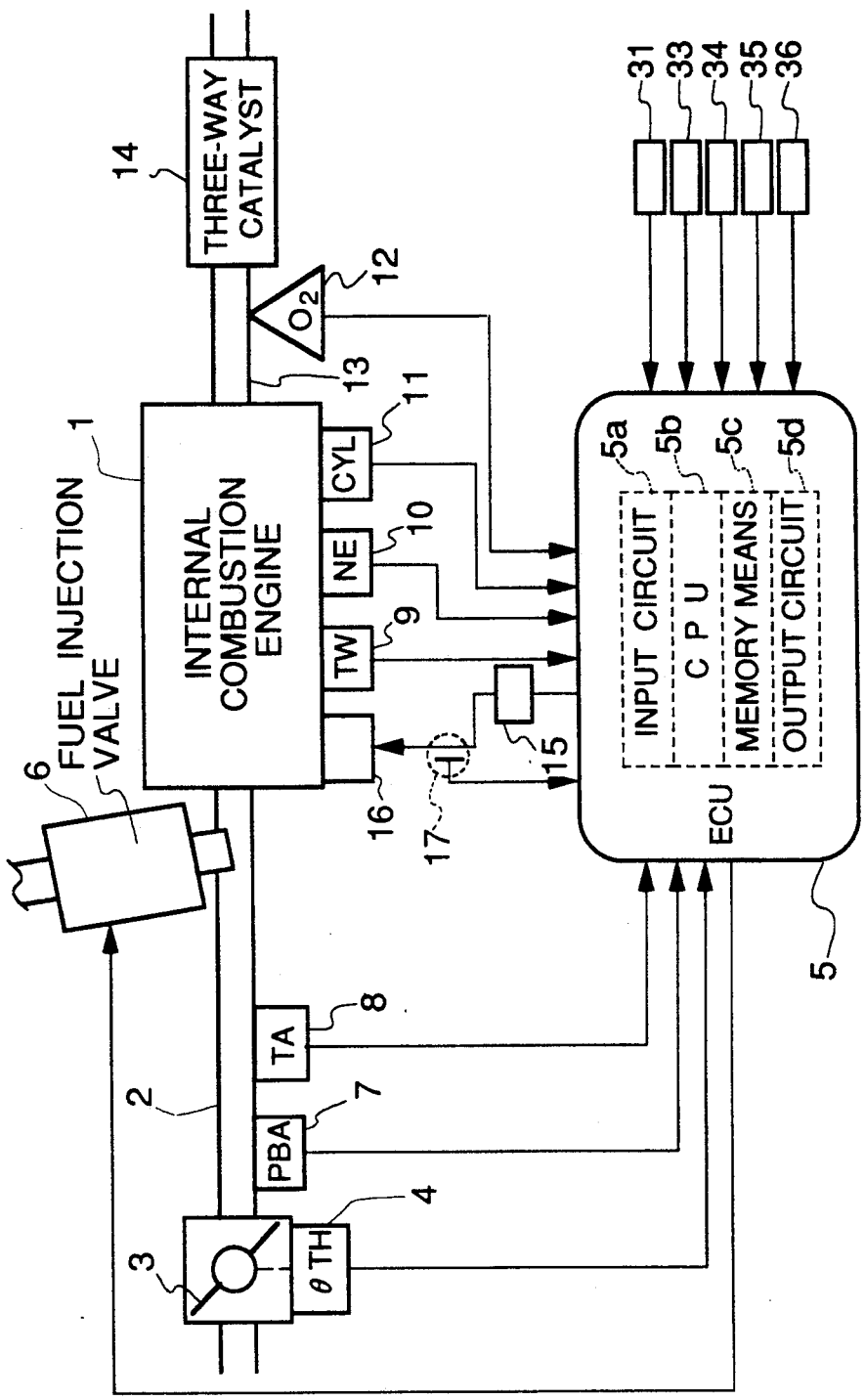
FIG. 1 is a block diagram showing the whole arrangement of an internal combustion engine and a control system therefor, according to a first embodiment of the invention.

Referring first to FIG. 1, there is shown the whole arrangement of an internal combustion engine (hereinafter simply referred to as "the engine") which is a four-cylinder type, for example, and a control system therefor according to a first embodiment of the invention. In an intake pipe 2 of the engine 1, there is arranged a throttle valve 3. A throttle valve opening (θTH) sensor 4 is connected to the throttle valve 3 for generating an electric signal indicative of the sensed throttle valve opening and supplying the same to an electronic control unit (hereinafter referred to as "the ECU") 5.

Fuel injection valves 6 are each provided for each cylinder and arranged in the intake pipe at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

Each cylinder of the engine is provided with a spark plug 16 which is electrically connected via a distributor 15 to the ECU 5 to have ignition timing θIG thereof controlled by the ECU 5. Arranged on an intermediate point of a connection line connecting between the distributor 15 and the spark plug 16 is a sparking voltage sensor 17 which is electrostatically coupled to the connection line (i.e. connected to the latter in a manner forming a capacitor of several pF in cooperation with the connection line), for supplying an electric signal indicative of the sensed sparking voltage to the ECU 5.

On the other hand, an intake pipe absolute pressure (PBA) sensor 7 is provided in communication with the interior of the intake pipe 2 via a conduit, not shown, at a location immediately downstream of the throttle valve 3 for supplying an electric signal indicative of the sensed absolute pressure PBA to the ECU 5. An intake air temperature (TA) sensor 8 is inserted into the intake pipe 2 at a location downstream of the intake pipe absolute pressure sensor 7 for supplying an electric signal indicative of the sensed intake air temperature TA to the ECU 5.

An engine coolant temperature (TW) sensor 9, which may be formed of a thermistor or the like, is mounted in the coolant-filled cylinder block of the engine 1 for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, neither of which is shown. The engine rotational speed sensor 10 generates a pulse as a TDC signal pulse at each of predetermined crank angles whenever the crankshaft rotates through 180 degrees, while the cylinder-discriminating sensor 11 generates a pulse at a predetermined crank angle of a particular cylinder of the engine, both of the pulses being supplied to the ECU 5.

A three-way catalyst 14 is arranged within an exhaust pipe 13 connected to the cylinder block of the engine 1 for purifying noxious components such as HC, CO and NOx. An oxygen concentration sensor 12 as an exhaust gas ingredient concentration sensor is mounted in the exhaust pipe 13 at a location upstream of the three-way catalyst 14, for supplying an electric signal having a level approximately proportional to the oxygen concentration in the exhaust gases to the ECU 5.

Also connected to the ECU 5 are a battery voltage sensor 31 for detecting a battery voltage VB from a battery, not shown, supplied to the ECU 5, driving wheel-speed sensors 33, 34 for detecting, respectively, the rotational speeds WFL, WFR of left and right driving wheels of an automotive vehicle on which the engine is installed, and trailing wheel-speed sensors 35, 36 for detecting, respectively, the rotational speeds WRL, WRR of left and right trailing wheels of the vehicle, the sensors 33-36 supplying electric signals indicative of the sensed speed values to the ECU 5.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., an output circuit 5d which outputs a driving signal to the fuel injection valves 6, etc.

The CPU 5b operates in response to the aforementioned signals from the sensors to determine a fuel injection period TOUT over which each fuel injection valve 6 should be opened and ignition timing θIG at which each spark plug 16 should be ignited, by the use of the following equations (1) and (2):

$$TOUTn = TI \times KDRn \times KLAF \times K1 + K2 \quad (1)$$

$$\theta IGn = \theta IGMAP + \theta IGDRn + \theta IGCR \quad (2)$$

where "n" indicates the number of the cylinder for which these parameters are calculated. TI and θIGMAP represent a basic fuel injection period and a basic ignition timing advance value, respectively, which are read from respective maps each set such that optimum values thereof are provided in a manner corresponding to values of the engine rotational speed NE and those of the intake pipe absolute pressure PBA, and stored in the memory means 5c.

KDRn and θIGDRn are a combustion roughness-dependent correction coefficient and a combustion roughness-dependent correction variable, respectively.

K1, K2 and θIGCR are other correction coefficients and correction variables determined according to various engine operating parameter signals.

The CPU 5b further carries out a traction control based on the driving wheel speeds WFL, WFR and the trailing wheel speeds WRL, WRR. The traction control is for reducing the output torque of the engine by leaning the air-fuel ratio or interrupting fuel supply (fuel cut), for example, when an excessive slip state of the driving wheels is detected.

The CPU 5b supplies the fuel injection valves 6 and the spark plugs 16, respectively, with driving signals based on the results of calculations and determinations carried out as above, through the output circuit 5d.

Figure 2:
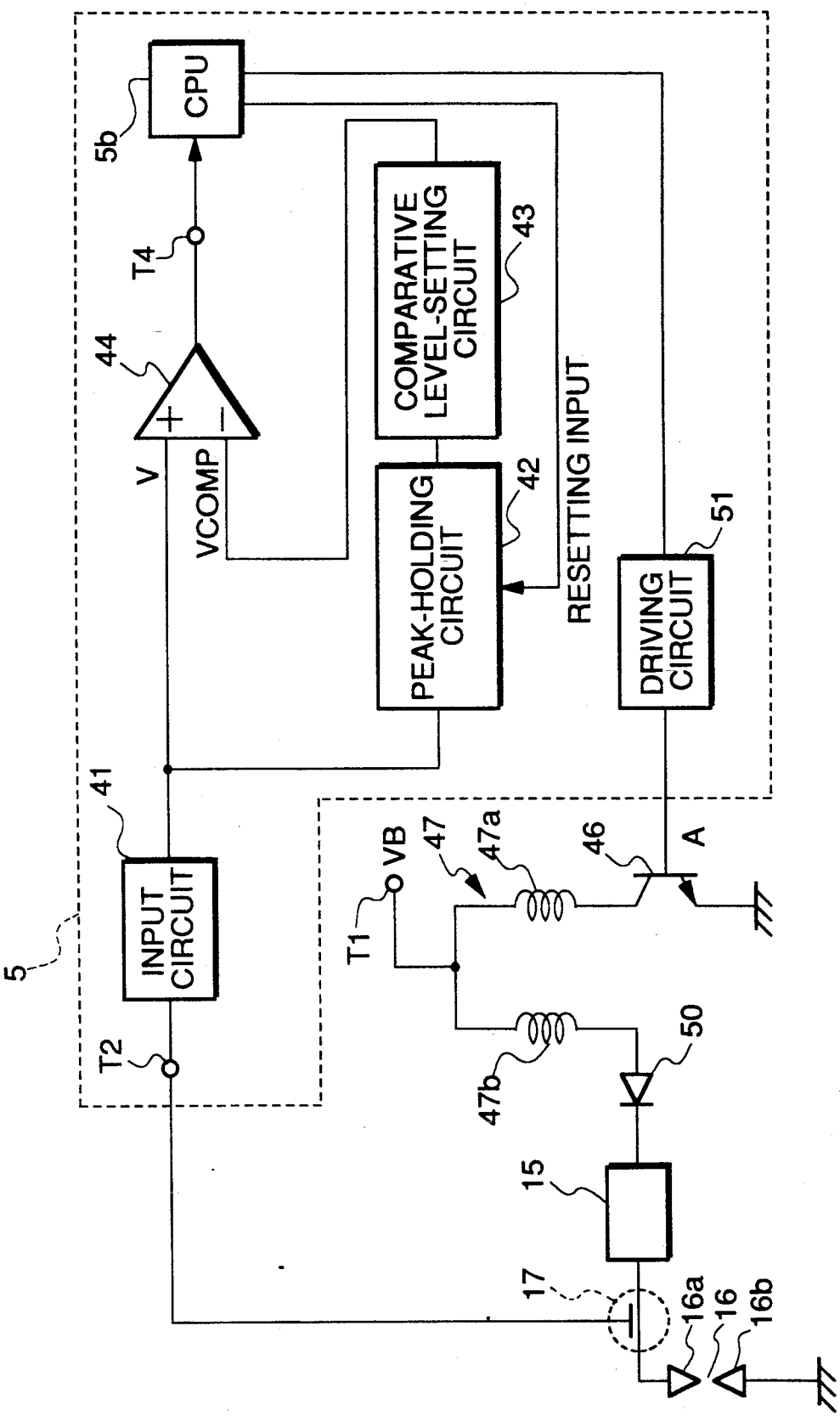
FIG. 2 is a schematic circuit diagram showing the circuit arrangement of the control system for detecting the combustion roughness according to the first embodiment.

FIG. 2 shows the circuit arrangement of the control system according to the present embodiment for detecting the combustion roughness. A feeding terminal T1, which is supplied with supply voltage VB, is connected to an ignition coil 47 comprised of a primary coil 47a, and a secondary coil 47b. The primary and secondary coils 47a, 47b are connected with each other at ends thereof. The other end of the primary coil 47a is connected to a collector of a transistor 46. The transistor 46 has its base connected via a driving circuit 51 to the CPU 5b and its emitter grounded. The base of the transistor 46 is supplied with an ignition command signal A from the CPU 5b so that when the transistor 46 is turned off in response to the signal A, the ignition coil 47 generates high voltage across the secondary coil 47b. The other end of the secondary coil 47b is connected via the distributor 15 to a center electrode 16a of the spark plug 16. The spark plug 16 has its grounding electrode 16b grounded.

The sparking voltage sensor 17 is connected via an input circuit 41 to a peak-holding circuit 42 and a non-inverting input terminal of a comparator 44. The output of the peak-holding circuit 42 is connected via a comparative level-setting circuit 43 to an inverting input terminal of the comparator 44. A resetting input terminal of the peak-holding circuit 42 is connected to the CPU 5b to be supplied with a resetting signal therefrom at an appropriate time for resetting a peak value of the sparking voltage held by the peak-holding circuit 42. An output from the comparator 44 is supplied to the CPU 5b. Further, a diode 50 is connected between the secondary coil 47b of the ignition coil 47 and the distributor 15.

Figure 3:
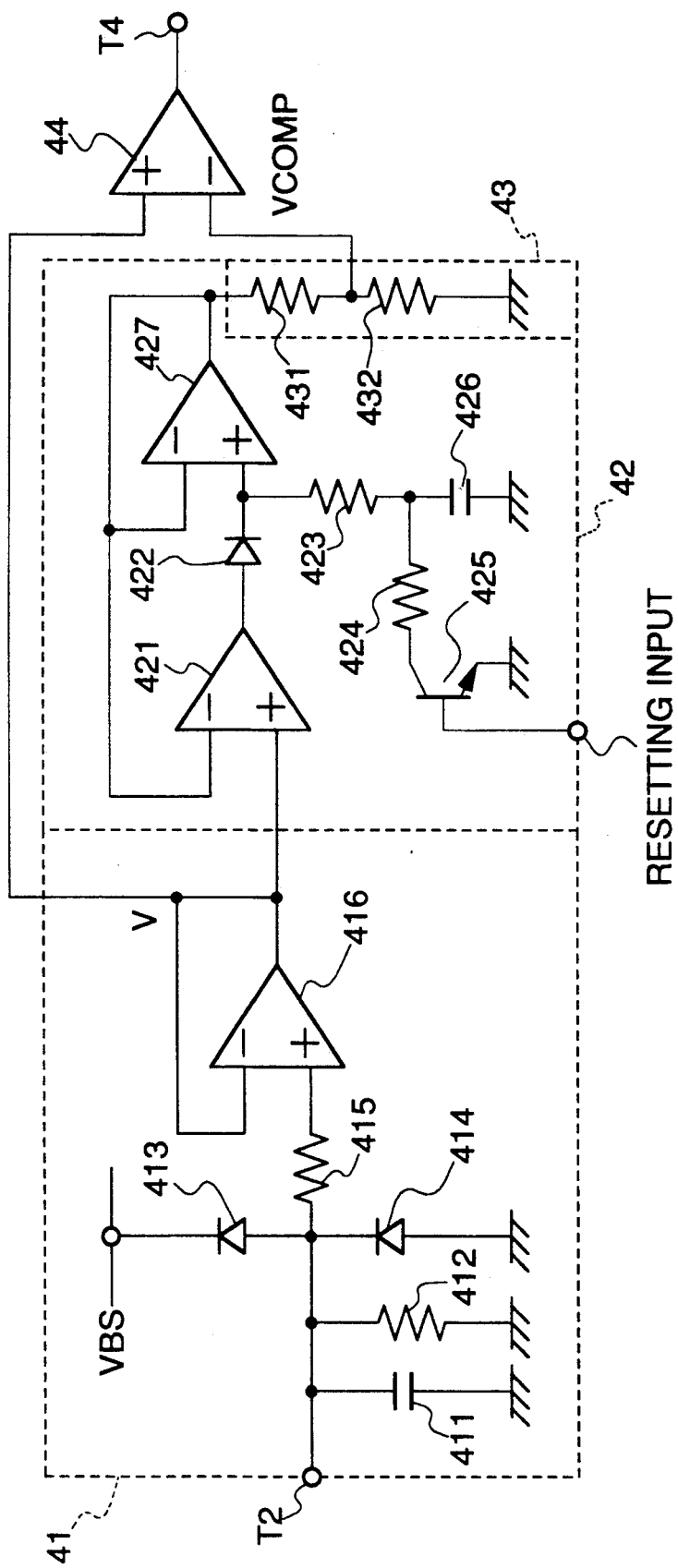
FIG. 3 is a circuit diagram showing details of an input circuit, a peak-holding circuit, and a comparative level-setting circuit appearing in FIG. 2.

FIG. 3 shows details of the input circuit 41, the peak-holding circuit 42 and the comparative level-setting circuit 43. In the figure, an input terminal T2 is connected to a non-inverting input terminal of an operational amplifier 416 via a resistance 415. The input terminal T2 is also grounded via a circuit formed of a capacitor 411, a resistance 412, and a diode 414, which are connected in parallel, and connected to a supply voltage-feeding line VBS via a diode 413.

The capacitor 411 has a capacitance of $10^4$pF, for example and serves to divide voltage detected by the sparking voltage sensor 17 into one over several thousands. The resistance 412 has a value of 500 K$\Omega$, for example. The diodes 413 and 414 act to control the input voltage to the operational amplifier 416 to a range of 0 to VBS. An inverting input terminal of the operational amplifier 416 is connected to the output of the same so that the operational amplifier 416 operates as a buffer amplifier (impedance converter).

The output of the amplifier 416 is connected to the non-inverting input terminal of the comparator 44 as well as an inverting input terminal of an operational amplifier 421. The output of the operational amplifier 421 is connected to a non-inverting input terminal of an operational amplifier 427 via a diode 422, with inverting input terminals of the amplifiers 421, 427 both connected to the output of the amplifier 427. Therefore, these operational amplifiers also operate toghether as a buffer amplifier.

The non-inverting input terminal of the operational amplifier 427 is grounded via a resistance 423 and a capacitor 426, the junction therebetween being connected to a collector of a transistor 425 via a resistance 424. The transistor 425 has its emitter grounded and its base supplied with a resetting signal from the CPU 5b. The resetting signal goes high when resetting is to be made.

The output of the operational amplifier 427 is grounded via resistances 431 and 432 forming the comparative level-setting circuit 43, the junction between the resistances 431, 432 being connected to the inverting input terminal of the comparator 44.

The circuit of FIG. 3 operates as follows: A peak value of the detected sparking voltage V (output from the operational amplifier 416) is held by the peak-holding circuit 42, the held peak value is multiplied by a predetermined value smaller than 1 by the comparative level-setting circuit 43, and the resulting product is applied to the comparator 44 as the comparative level VCOMP. Thus, a pulse signal indicative of the comparison result, which goes high when V>VCOMP stands, is output from the comparator 44 through a terminal T4.

The operation of the circuitries 41 to 44 arranged as above will now be explained with reference to a timing chart of FIG. 4a to FIG. 4c. In FIG. 4b and FIG. 4c, the solid lines show operation at normal firing, while the broken lines show operation at a misfire attributable to the fuel supply system in which the combustion roughness becomes the maximum (hereinafter referred to as "FI misfire"). FIG. 4a shows the ignition command signal A.

FIG. 4b show changes in the detected sparking voltage (output voltage from the input circuit 41) V (B, B') and the comparative level (C, C') with the lapse of time. First, a sparking voltage characteristic obtainable in the case of normal firing, which is indicated by the solid line, will be explained with reference to these figures.

Immediately after the time point t0 the ignition command signal A is generated, the sparking voltage rises to such a level as to cause dielectric breakdown of the mixture between the electrodes of the spark plug, and then the discharge state shifts from a capacitive discharge state before the dielectric breakdown (early-stage capacitive discharge), which state has a very short duration with several hundreds amperes of current flow, to an inductive discharge state which has a duration of several milliseconds and where the sparking voltage assumes almost a constant value with several tens milliamperes of current flow. The inductive discharge voltage rises with an increase in the pressure within the engine cylinder caused by the compression stroke of the piston executed after the time point t0, since a higher voltage is required for inductive discharge to occur as the cylinder pressure increases. At the final stage of the inductive discharge, the voltage between the electrodes of the spark plug falls below a value required for the inductive discharge to continue, due to decreased inductive energy of the ignition coil so that the inductive discharge ceases and again capacitive discharge (late-stage capacitive discharge) occurs. In this late-stage capacitive discharge state, the voltage between the spark plug electrodes again rises, i.e. in the direction of causing dielectric breakdown of the mixture. However, since the ignition coil 49 then has a small amount of residual energy, the amount of rise of the voltage is small. This is because the electrical resistance of the discharging gap is low due to ionizing of the mixture during firing.

In this connection, electric charge stored in the floating capacitance between the diode 50 and the spark plug 16 (residual charge not discharged between the electrodes) does not discharge toward the ignition coil 49 due to the presence of the diode 50. However, the electric charge is neutralized by ions present in the vicinity of the electrodes of the spark plug 16 and hence the sparking voltage V quickly decreases after termination of the capacitive discharge.

Next reference is made to a sparking voltage characteristic, which is obtained when an FI misfire occurs, which is caused by the supply of a lean mixture to the engine or cutting-off of the fuel supply to the engine due to failure of the fuel supply system, etc. Immediately after the time point t0 of generation of the ignition command signal A, the sparking voltage V (B') rises above a level causing dielectric breakdown of the mixture. In this case, the ratio of air in the mixture is greater than when the mixture has an air-fuel ratio close to a stoichiometric ratio, and accordingly the dielectric strength of the mixture is high. Besides, since the mixture is not fired, it is not ionized so that the electrical resistance of the discharging gap of the plug is high. Consequently, the dielectric breakdown voltage becomes higher than that obtained in the case of normal firing of the mixture.

Thereafter, the discharge state shifts to an inductive discharge state, as in the case of normal firing. Also, the electrical resistance of the discharging gap of the plug at the discharge is greater in the case of supply of a lean mixture, etc. than that in the case of normal firing so that the inductive discharge voltage rises to a higher level than at normal firing, resulting in an earlier shifting from the inductive discharge state to a capacitive discharge state (late-stage capacitive discharge). The capacitive discharge voltage upon the transition from the inductive discharge state to the capacitive discharge state is by far higher than that at normal firing, because the voltage of dielectric breakdown of the mixture is higher than that at normal firing.

In this state, since almost no ion is present in the vicinity of the electrodes of the spark plug 16, charge stored between the diode 50 and the spark plug 16 is not neutralized by ions, and at the same time, the diode 50 prevents the charge from flowing back to the ignition coil 49, so that the charge is held as it is, and only when the pressure within the cylinder drops to such a level as to lower the voltage required for discharge to occur between the electrodes of the spark plug 16 to a level equal to the voltage created by the charge, the charge is discharged by way of the electrodes of the spark plug 16 (time point t5 in FIG. 4b). Thus, even after termination of the capacitive discharge, the sparking voltage V continues to be high over a longer time period than when normal firing occurs.

The curves C, C' in FIG. 4b show changes in the comparative level VCOMP with the lapse of time, obtained from the held peak value of the sparking voltage V. The peak-holding circuit 42 is reset during time points t2 and t3. Therefore, the curves before the time point t2 show the comparative level VCOMP obtained from the last cylinder which was subjected to ignition. FIG. 4c shows outputs from the comparator 44 (hereinafter referred to as "the comparison result pulses"). As is clear from FIG. 4b and FIG. 4c, at normal firing, V>VCOMP holds between time points t2 and t4, whereas at a misfire, V>VCOMP holds between time points t1 and t5, and during each of the durations, the output from the comparator 44 has a high level.

Figure 4:
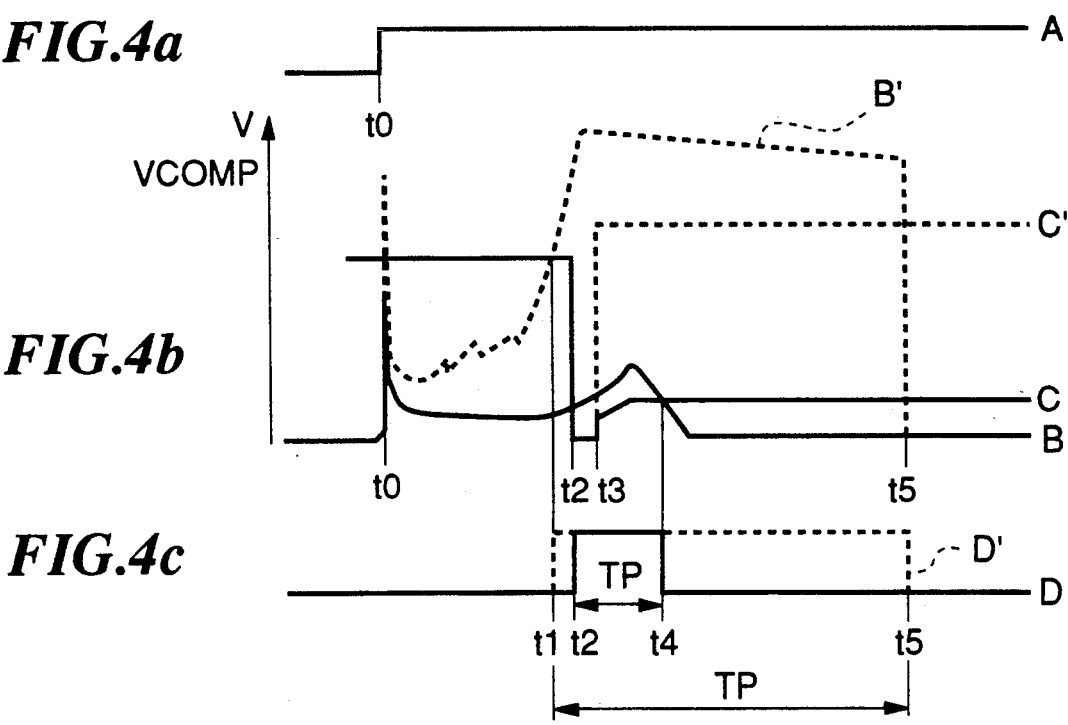
FIGS. 4A, 4B and 4C are a timing chart showing changes in the sparking voltage occurring at normal firing and at a misfire.
Figure 5:
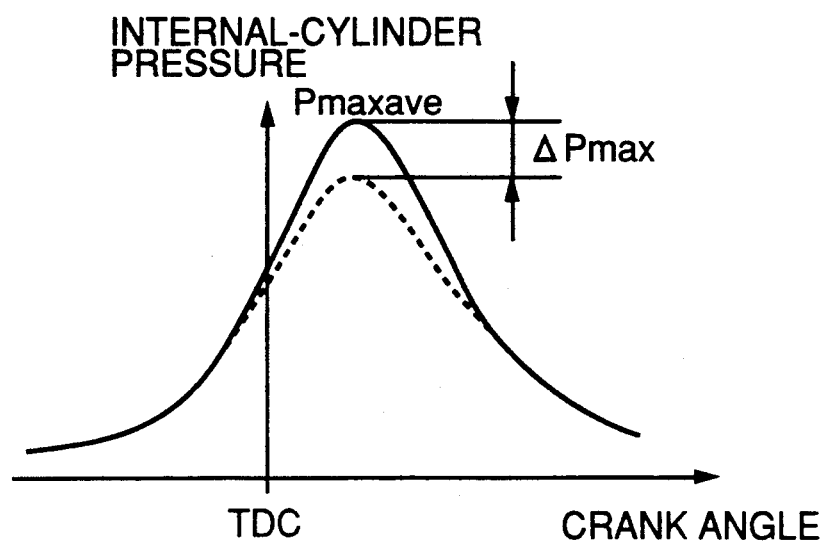
FIG. 5 is a diagram depicting changes in internal cylinder pressure relative to the crank angle.
Figure 6A:
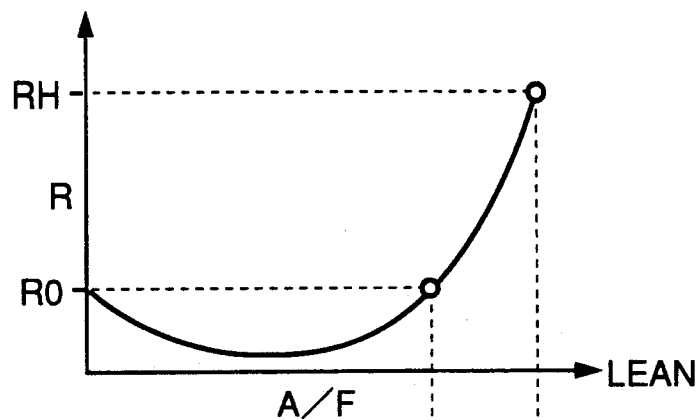
FIG. 6a is a diagram showing the relationship between the air-fuel ratio A/F and the combustion roughness R.
Figure 6B:
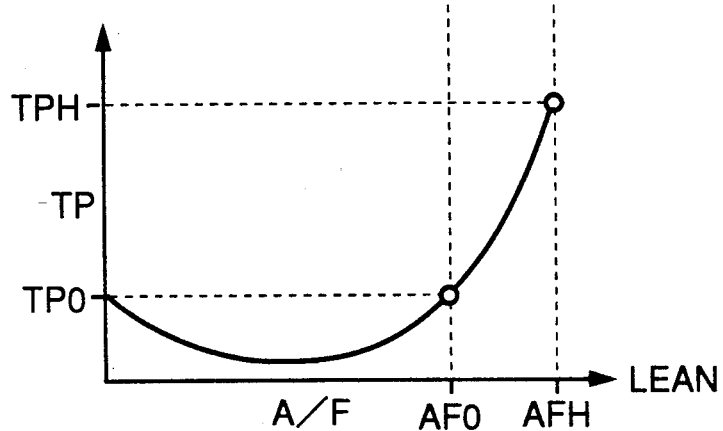
FIG. 6b is a diagram showing the relationship between the air-fuel ratio A/F and a duration TP of a comparison result pulse.
Figure 6C:
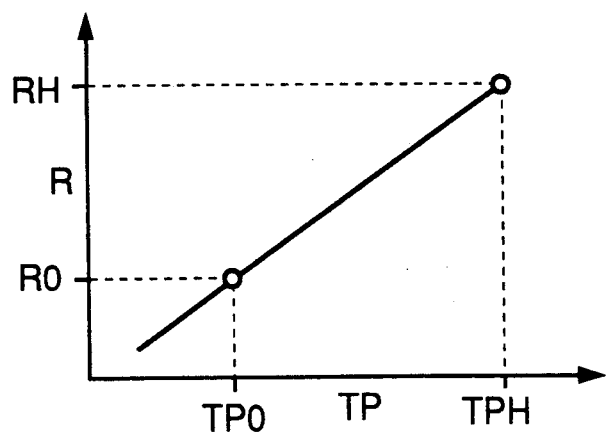
FIG. 6c is a diagram showing the relationship between the duration TP of the comparison result pulse and the combustion roughness R.

Here, the combustion roughness R is defined as a ratio ΔPmax/Pmaxave which is the ratio which is the ratio of a variation ΔPmax of the maximum pressure Pmax of internal-cylinder pressure to an average value Pmaxave of the maximum value Pmax. Examples of the average value Pmaxave and the variation ΔPmax of the maximum pressure Pmax are illustrated in FIG. 5b. The combustion rough R defined as above varies in dependence on the air-fuel ratio A/F of a mixture supplied to the engine in accordance with the relationship between the air-fuel ratio A/F and the combustion roughness R as shown in FIG. 6a. If the above relationship is related to the combustion roughness detection arrangement shown in FIGS. 2-4, the relationship between the air-fuel ration A/F and the duration TP of the comparison result pulse (a time period from the time point t2 to the time point t4, or a time period from the time point t1 to the time point t5 as shown in FIG. 4c) can be depicted as shown in FIG. 6b. According to FIG. 6a and FIG. 6b, when A/F=AFH, a misfire occurs (a complete misfire as indicated by the broken lines in FIG. 4b and FIG. 4c), whereas when A/F<AFO (e.g. 14.7), good combustion occurs (as indicated by the solid lines in FIG. 4b and FIG. 4c). Therefore, in a range from an A/F value close to A/FO to the value AFH, the relationship between the the duration TP of the comparison result pulse and the combustion roughness R can be depicted as in FIG. 6c. Therefore, by measuring the duration TP, the combustion roughness R can be determined.

The determination of the combustion roughness R based on the voltage V detected by the sparking voltage sensor 17 has the following advantageous effects:

The sparking voltage sensor 17 can be easily implemented by winding a conductor around a high-tension cord connected to the spark plug or arranging the former along the latter. Therefore, it can be easily mounted or fixed because of its simple construction compared with the combustion pressure sensor and the combustion light sensor. It can be manufactured at a low cost, and can be employed in engines in general for ordinary passenger cars and motorcycles.

Further, the sparking voltage sensor 17 does not require to be mounted on a plug seat for the spark plug nor to be mounted in the combustion chamber, as is different from the case with the combustion pressure sensor, etc., and hence it will not be used under severe conditions. Therefore, a combustion roughness sensor can be realized, which is much more excellent in respect of durability and reliability as well.

Figure 7:
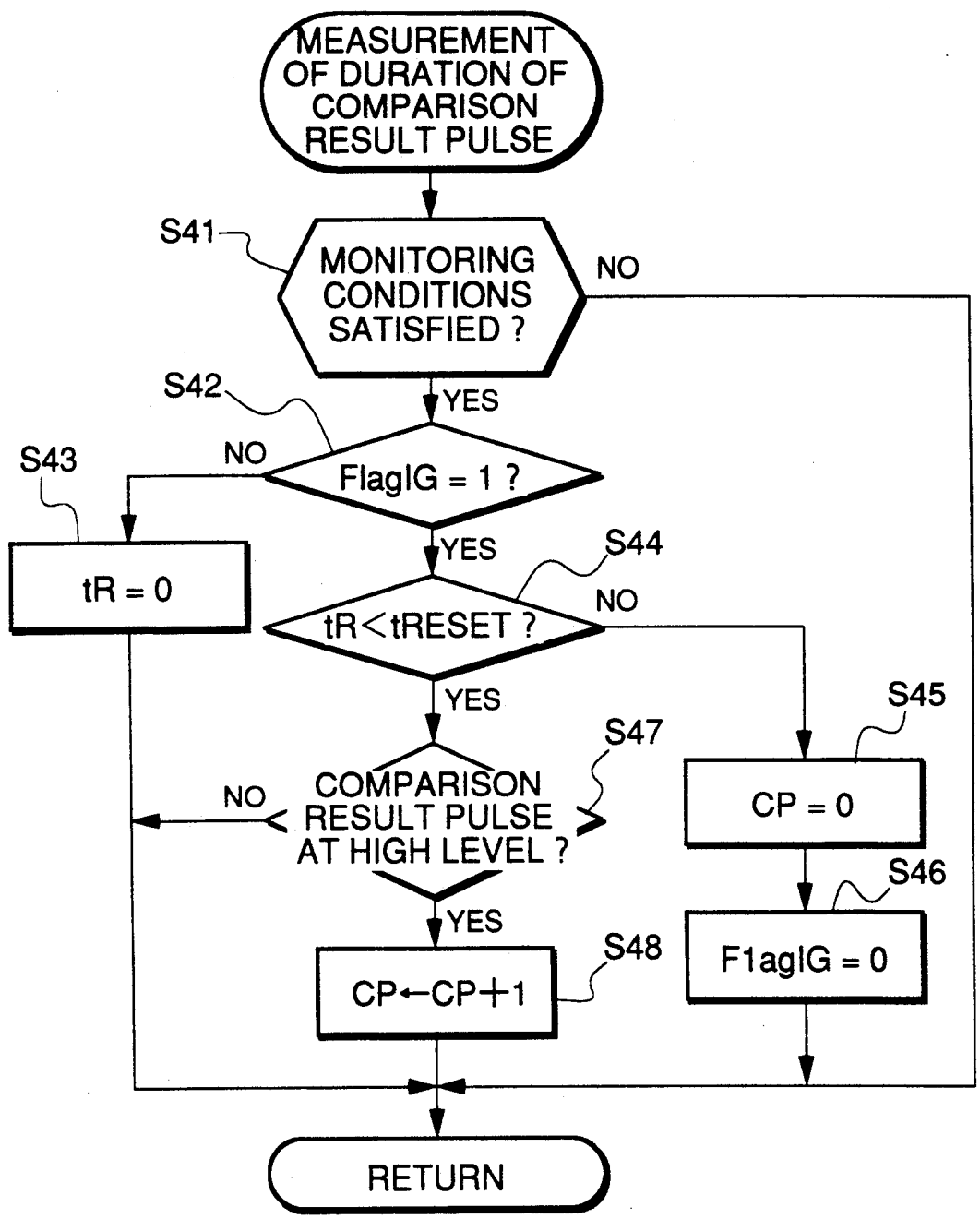
FIG. 7 is a flowchart showing a program for measuring the duration TP of the comparison result pulse.

FIG. 7 shows a program for measuring the duration TP of the comparative result pulse, which is executed by the CPU 5b at predetermined fixed intervals.

First, at a step S41, it is determined whether or not monitoring conditions are satisfied. The monitoring conditions are satisfied when the engine is in a condition in which the misfire determination should be carried out. The determination of this step is carried out by a subroutine described hereinafter with reference to FIG. 8. If the answer to this question is negative (NO), the program is immediately terminated.

If the answer is affirmative (YES), i.e. if the monitoring conditions are satisfied, it is determined at a step S42 whether or not a flag IG is equal to 1. The flag IG set to "1" when the ignition command signal A is generated, by a routine for calculating the ignition timing advance value, not shown. If the answer to this question is negative (NO), i.e. if the flag IG is equal to 0, a measured time value tR of a resetting timer is set to 0 at a step S43, followed by terminating the program. If the answer to the question of the step S42 is affirmative (YES), i.e. if the flag IG is equal to 1, it is determined at a step S44 whether or not the measured time value tR of the resetting timer is smaller than a predetermined value tRESET. Immediately after the flag IG has been changed from 0 to 1, the answer to this question is affirmative (YES), and then at a step S47, it is determined whether or not the comparator 44 is generating a high level output, i.e. a comparison result pulse. If the answer to this question is negative (NO), the program is immediately terminated, whereas if the answer to this question is affirmative (YES), a count value CP of a counter is increased by an increment of 1 at a step S48, followed by terminating the program.

If the answer to the question of the step S44 becomes negative (NO), i.e. if tR>tRESET, the count value CP is set to 0 and the flag IG is reset to 0 at respective steps S45 and S46, followed by the program proceeding to the step S50.

Thus, according to this program, the count value CP is obtained, which is proportional to the duration TP of the comparison result pulse.

Figure 8:
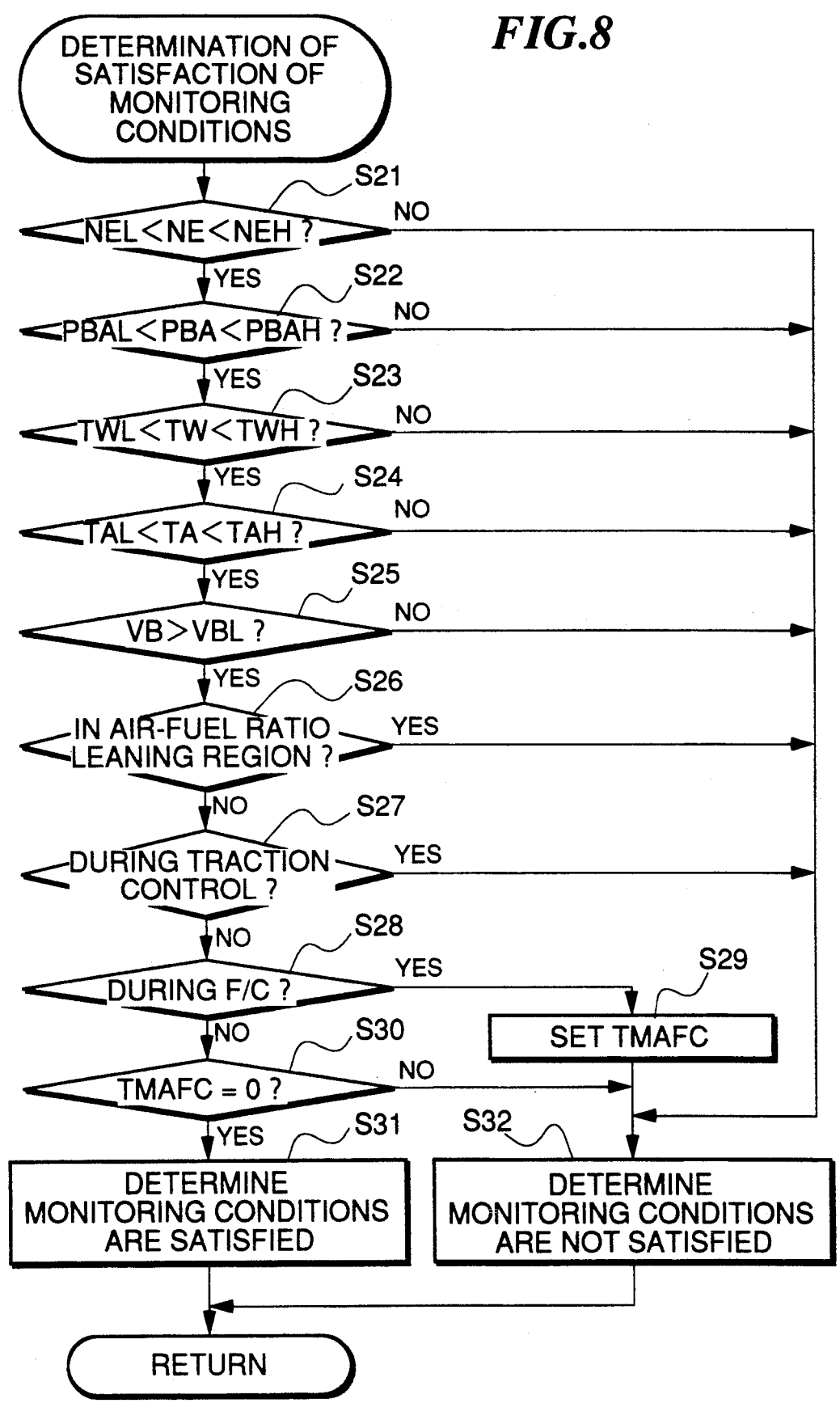
FIG. 8 is a subroutine for determining whether or not monitoring conditions are satisfied.

FIG. 8 shows the aforementioned subroutine for determining whether or not the monitoring conditions are satisfied.

At steps S21 to S25, it is determined whether or not values of parameters indicative of an operating condition in which the engine is operating are within respective predetermined ranges. More specifically, it is determined at a step S21 whether or not the engine rotational speed NE falls within a predetermined range defined by a lower limit value NEL (e.g. 500 rpm) and an upper limit value (e.g. 6,500 rpm), at a step S22 whether or not the intake pipe absolute pressure PBA falls within a predetermined range defined by a lower limit value PBAL (e.g. 260 mm Hg) and an upper limit value PBAH (e.g. 760 mm Hg), at a step S23 whether or not the engine coolant temperature TW falls within a predetermined range defined by a lower limit value TWL (e.g. 40° C.) and an upper limit value TWH (e.g. 110° C.) at a step S24 whether or not the intake air temperature TA falls within a predetermined range defined by a lower limit value TAL (e.g. 0° C.) and an upper limit value TAH (e.g. 80° C.), and at a step S25 whether or not the battery voltage VB is higher than a predetermined lower limit value VBL (e.g. 10 V). If any of the answers to these questions is negative (NO), it is determined at a step S32 that the monitoring conditions are not satisfied. These determinations are provided in view of the fact that if the engine is in a steady operating condition in which engine controls based upon the combustion roughness control (combustion roughness control) can be carried out, normally the engine rotational speed NE, the intake pipe absolute pressure PBA, the engine coolant temperature TW and the intake air temperature TA should fall within the respective predetermined ranges shown above, and that if the battery voltage VB is low, the sparking voltage cannot be high enough to ensure reliable combustion roughness control.

If all the answers to these questions are affirmative (YES), it is determined at a step S26 whether or not the air-fuel ratio leaning control is being carried out in an open-loop manner, i.e. irrespective of the output from the oxygen concentration sensor 12, i.e. the air-fuel ratio is being controlled to a leaner value than the stoichiometric value (which control is carried out, e.g. when the engine is decelerating), and it is determined at a step S27 whether or not the traction control is being carried out. If either of the answers to these questions is affirmative (YES), the program proceeds to the step S32 to determine that the monitoring conditions are not satisfied. These steps S26, S27 are provided in view of the fact that the combustion of the air-fuel mixture becomes unstable during the air-fuel ratio leaning control and the traction control, and hence it is difficult to carry out engine controls based on the combustion roughness, described hereinafter.

If both the answers to these questions are negative (NO), it is determined at a step S28 whether or not fuel cut is being carried out. If the answer to this question is affirmative (YES), a timer TMAFC is set to a predetermined time period (e.g. 1 second) and started at a step S29, and then the program proceeds to the step S32 to determine that the monitoring conditions are not satisfied. If the answer to the question of the step S28 is negative (NO), i.e. if fuel cut is not being carried out, it is determined at a step S30 whether or not the count value of the timer TMFAC is equal to 0. If the answer to this question is negative (NO), i.e. if the predetermined time period has not elapsed after termination of fuel cut, the program proceeds to the step S32 to determine fulfillment of the monitoring conditions, whereas if the answer is affirmative (YES), the program proceeds to a step S31 where it is determined that the monitoring conditions are satisfied. The steps S29, S30 are based upon the fact that the combustion of the air-fuel mixture also becomes unstable immediately after fuel cut.

According to the FIG. 8 program, if any of the aforementioned engine operating parameters (NE, PBA, TW, TA, VB) is not within the respective predetermined ranges, if the air-fuel ratio leaning control or the traction control is being carried out, or if fuel cut is being carried out or the predetermined time period has not elapsed after termination of fuel cut, it is determined that the monitoring conditions are not satisfied. Otherwise, it is determined that the monitoring conditions are satisfied.

Figure 9:
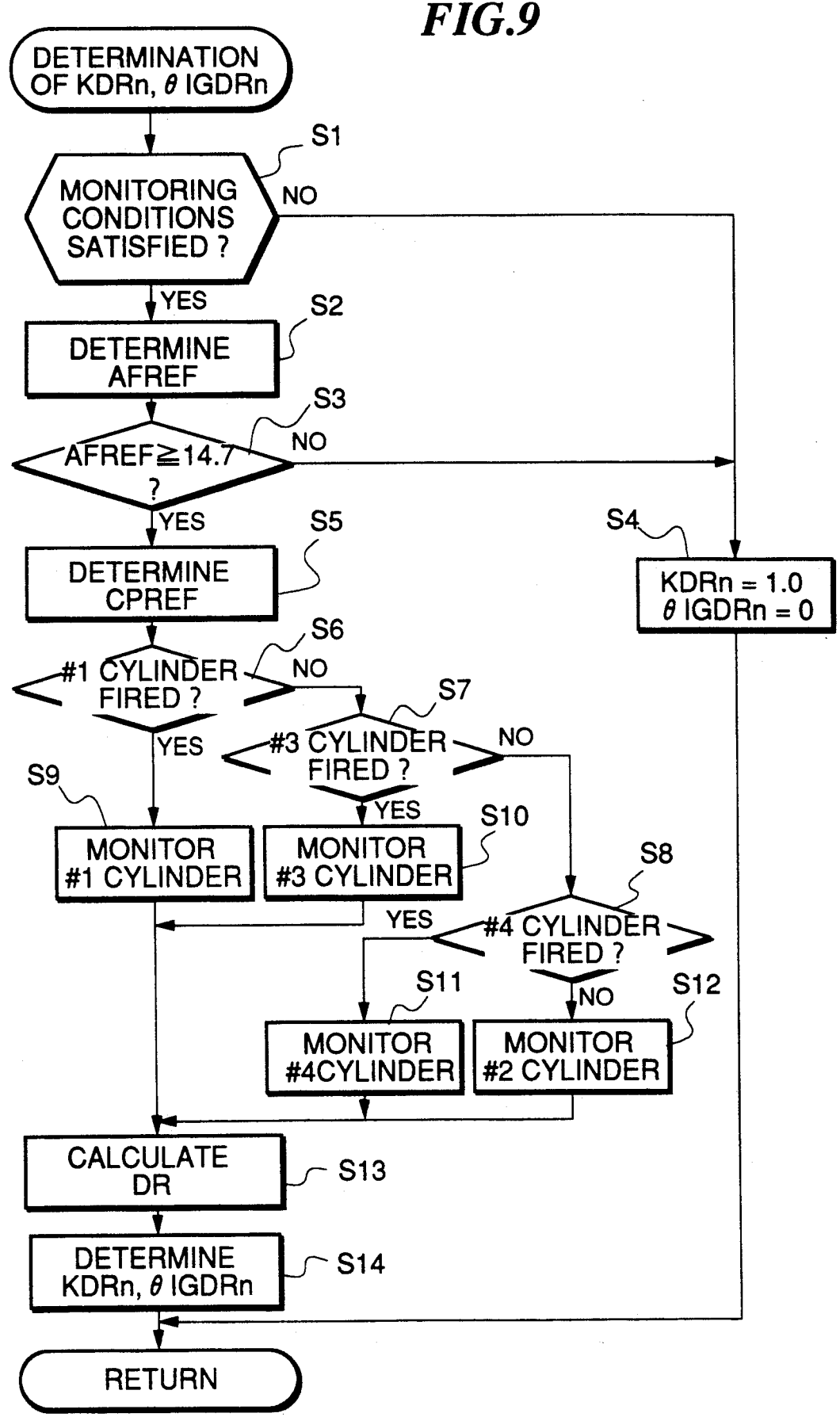
FIG. 9 is a flowchart showing a program for determining a combustion roughness-dependent correction coefficient KDRn and a combustion roughness-dependent correction variable $\theta$IGDRn.

FIG. 9 shows a program for controlling the combustion roughness based on the count value CP representative of the duration TP of the comparison result pulse, which is executed in synchronism with generation of each TDC signal pulse.

At a step S1, it is determined whether or not the monitoring conditions are satisfied. If the answer to this question is negative (NO), the combustion roughness-dependent correction coefficient KDRn to be applied to the equations (1) and (2) is set to a value of 1.0, and the combustion roughness-dependent correction variable $\theta$IGDRn is set to 0, at a step S4, followed by terminating the program. That is, if the monitoring conditions are not satisfied, the combustion roughness control based on the count value CP is not carried out.

Figure 10:
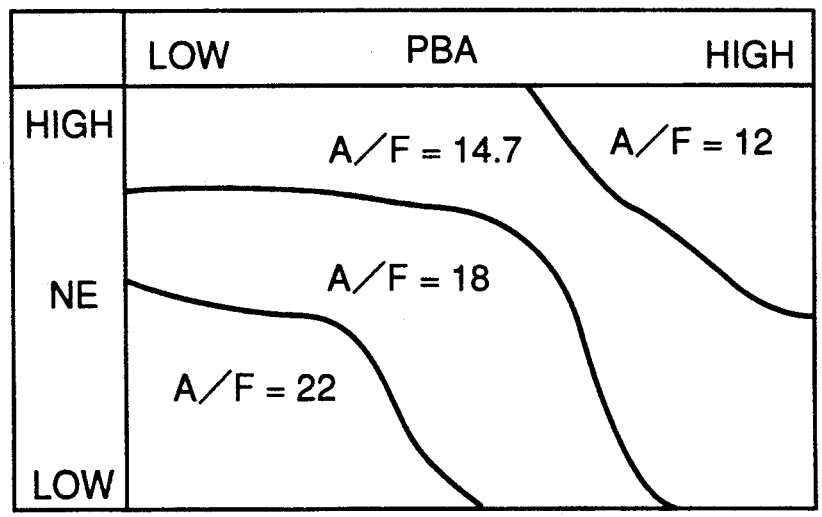
FIG. 10 is a map for determining a desired air-fuel ratio.

If the answer to the question of the step S1 is affirmative (YES), a reference air-fuel ratio AFREF is determined at a step S2 by retrieving an A/F map, which is set, e.g. as shown in FIG. 10, such that predetermined values thereof are provided correspondingly to values of the engine rotational speed NE and values of the intake pipe absolute pressure PBA, according to the detected NE and PBA values, and additionally by interpolation, if required.

Figure 11:
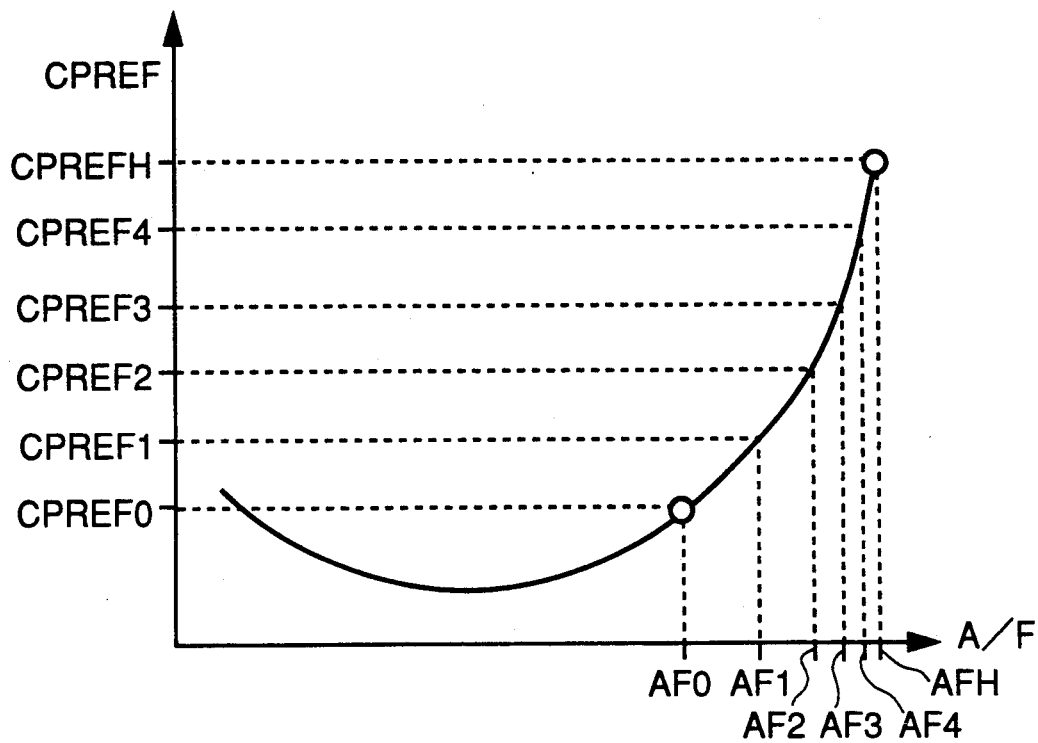
FIG. 11 shows a table for determining a reference value CPREF.

At the following step S3, it is determined whether or not the reference air-fuel ratio AFREF is equal to or larger than 14.7, i.e. whether or not the air-fuel mixture supplied to the engine should be stoichiometric or learner. If the answer to this question is negative (NO), i.e. if the reference air-fuel ratio AFREF is richer than the stoichiometric value, the program proceeds to a step S4. If the answer to the question is affirmative (YES), a reference value CPREF of the count value CP corresponding to a reference combustion roughness RREF is determined by retrieving a CPREF table according to the reference air-fuel ratio AFREF. The CPREF table is set, e.g. as shown in FIG. 11, such that predetermined values of the reference value CPREF of the count value CP are set correspondingly to values of the desired air-fuel ratio AFREF. The setting values in the table are determined based on the relationship between the air-fuel ratio A/F and the duration TP of the comparison result pulse shown in FIG. 6b.

At the following steps S6 to S12, it is determined which of the cylinders #1 to #4 has just passed a spark ignition angle immediately before execution of the present loop of the program, and a count value CPn (n designates the number of the cylinder determined to have passed the spark ignition angle) is read in as a value corresponding to the cylinder which has just passed the spark ignition angle.

At the following steps S13 and S14, the difference DR between the desired value CPREF and the count value CPn is calculated by the use of the following equation (3), and the combustion roughness-dependent correction coefficient KDRn and variable $\theta$IGDRn are calculated according to the difference DR, followed by terminating the program:

$$DR = CPREF - CPn \qquad (3)$$

Figure 12A:
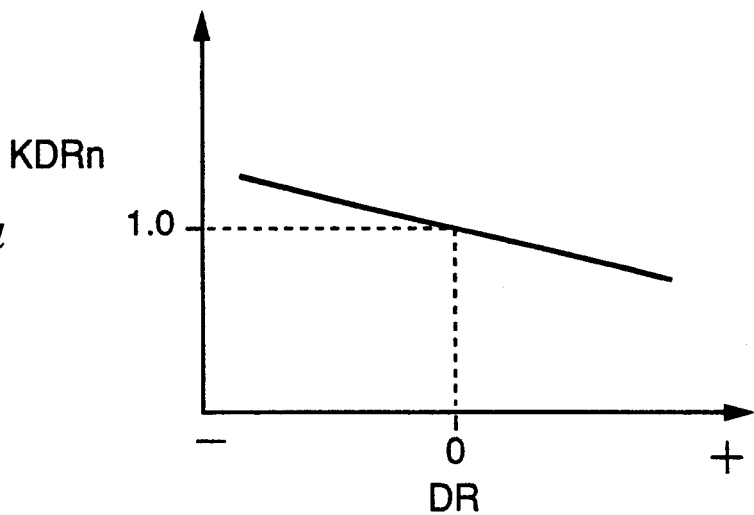
FIG. 12a is a diagram useful in explaining a manner of determining the roughness-dependent correction coefficient KDRn.

The combustion roughness-dependent correction coefficient KDRn is set, e.g. as shown in FIG. 12a, such that it assumes a value of 1.0 (non-correction value) when DR=0, a value larger than 1.0 when DR<0, and a value smaller than 1.0 when DR>0 (as the DR value increases, the KDRn value decreases).

Figure 12B:
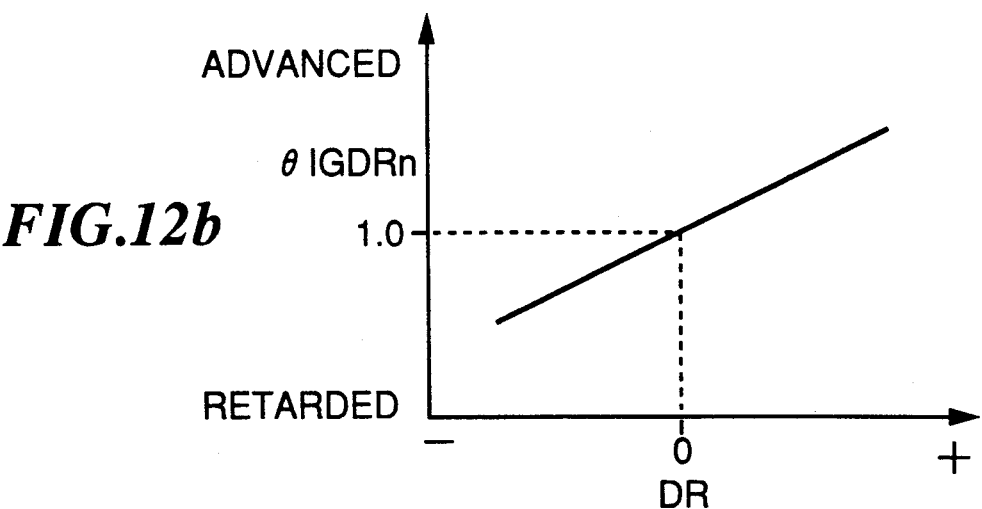
FIG. 12b is a diagram useful in explaining a manner of determining the roughness-dependent correction variable $\theta$IGDRn.

Further, the combustion roughness-dependent correction variable $\theta$IGDRn is set, e.g. as shown in FIG. 12b, such that it assumes a value of 1.0 (non-correction value) when DR=0, a value smaller than 1.0 when DR<0, and a value larger than 1.0 when DR>0 (as the DR value increases, the $\theta$IGDRn value increases). Therefore, when the detected combustion roughness R (or CP) is larger than the reference combustion roughness RREF (or CPREF), the fuel supply amount is increased and the ignition timing is retarded at the same time, whereas when the detected combustion roughness R is smaller than the reference combustion roughness RREF, the fuel supply amount is reduced and the ignition timing is advanced at the same time.

According to the FIG. 9 program, when the reference air-fuel ratio AFREF is set to 14.7 or a value close thereto, or to a leaner value, the fuel supply amount TOUT and the ignition timing $\theta$IG are controlled such that the detected combustion roughness R (i.e. the count value CP) becomes equal to the combustion roughness RREF (the value CPREF).

Thus, the air-fuel ratio leaning control can be performed to the utmost extent insofar as the drivability is not degraded, that is, the air-fuel ratio is leaned to the maximum possible extent, resulting in reduced fuel consumption and improved exhaust emission characteristics, as compared with the conventional leaning control in which the air-fuel ratio is leaned to a relatively moderate degree so as not to cause a degradation in the driveability, etc.

Further, even when the engine is in a low load operating condition, such as a vehicle-cruising or idling condition, which frequently occurs in actual traveling of the vehicle, the combustion roughness can be reliably detected, thereby achieving enhanced accuracy of the combustion roughness control in such an engine operating condition, and hence making it possible to secure fuel economy and excellent exhaust emission characteristics as well as excellent driveaility under a wide range of engine operating conditions.

Further, the combustion roughness control can be carried out for each cylinder independently of the other cylinders, which can minimize control variation between the cylinders, whereby it is possible to reduce vibrations of the whole engine, fluctuations in the engine rotational speed NE which might otherwise occur e.g. when the engine is idling, and the frequency of knocking, as well as to reduce the fuel consumption. In addition, the reduction of the frequency of knocking leads to an increase in the engine output.

Next, a second embodiment of the invention will be described.

The whole arrangement of an internal combustion engine and a control system therefor, according to the second embodiment, is substantially identical with that shown in FIG. 1, except that the linear output type oxygen concentration sensor 12 is omitted. The control system according to this embodiment is adapted to control the air-fuel ratio of a mixture supplied to the engine to a desired value, based on the count value CP corresponding to the duration TP of the comparison result pulse, in view of the fact that when the air-fuel ratio A/F is in a range leaner than the value AFO, the duration TP of the comparison result pulse corresponds to the air-fuel ratio A/F approximately linearly, as shown in FIG. 6b.

Figure 13:
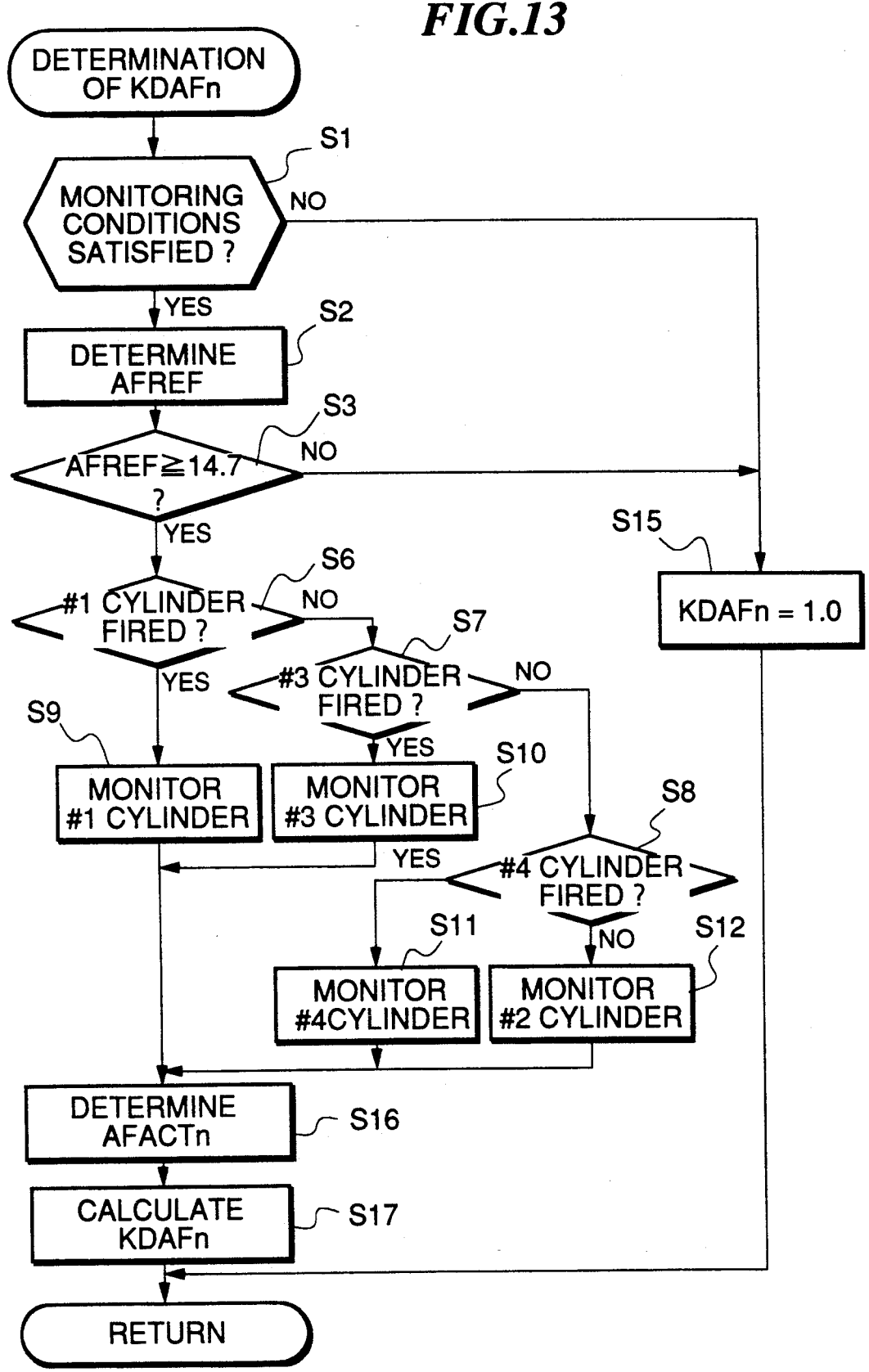
FIG. 13 is a flowchart of a program for determining an air-fuel ratio correction coefficient KDAFn according to a second embodiment of the invention.

Therefore, in this embodiment, the fuel injection period TOUTn is calculated by the use of the following equation (4) in place of the aforementioned equation (1):

$$TOUTn = TI \times KDAFn \times K1 \times K2 \qquad (4)$$

where KDAFn is an air-fuel ratio correction coefficient which is used in place of the air-fuel ratio correction coefficient KLAF in the equation (1), and determined by a subroutine described below with reference to FIG. 13. This subroutine is executed in synchronism with generation of each TDC signal pulse.

In the figure, the steps S1 to S3 and S6 to S12 are identical with the corresponding ones in FIG. 9, referred to hereinbefore.

If either the answer to the question of the step S1 or the answer to the question of the step S3 is negative (NO), i.e. if the monitoring conditions are not satisfied or the reference air-fuel ratio AFREF is richer than 14.7, the KDAFn value is set to a value of 1.0 (non-correction value) at a step S15, followed by terminating the program.

At a step S16 following the loop of the steps S6–S12, the actual air-fuel ratio AFACTn is determined for each cylinder based on the count value CP. This determination of the actual air-fuel ratio AFACTn is carried out based on a table which is prepared by converting the relationship between the TP value and the A/F value to the relationship between the CP value and the A/F value.

At the following step S17, the air-fuel ratio correction coefficient KDAFn is calculated by the use of the following equation (5), followed by terminating the program:

$$KDAFn = AFACTn / AFREF \qquad (5)$$

where AFREF is the aforementioned reference air-fuel ratio determined at the step S2.

According to the equation (5), when AFACTn=AFREF, KDAFn is set to 1.0, when AFACT>AFREF (the actual air-fuel ratio is leaner than the reference value), KDAFn is set to a value larger than 1.0, and when AFACTn<AFREF (the actual air-fuel ratio is richer than the reference value), KDAFn is set to a value smaller than 1.0. Thus, the fuel supply amount is controlled such that the actual air-fuel ratio AFACTn becomes equal to the reference or desired air-fuel ratio AFREF.

According to the present embodiment, by using the sparking voltage sensor which is simple in construction and can be easily mounted, it is possible to control the air-fuel ratio in a feedback manner to a desired value assuming a stoichiometric value or a value in its vicinity, or to a value leaner than the stoichiometric value, while dispensing with the use of a linear output type oxygen concentration sensor which is complicated in construction and expensive in cost, whereby it is possible to reduce the cost of the control system for the engine, and improve the reliability thereof.

Next, a third embodiment of the invention will be described with further reference to FIG. 14 to FIG. 18c.

Figure 14:
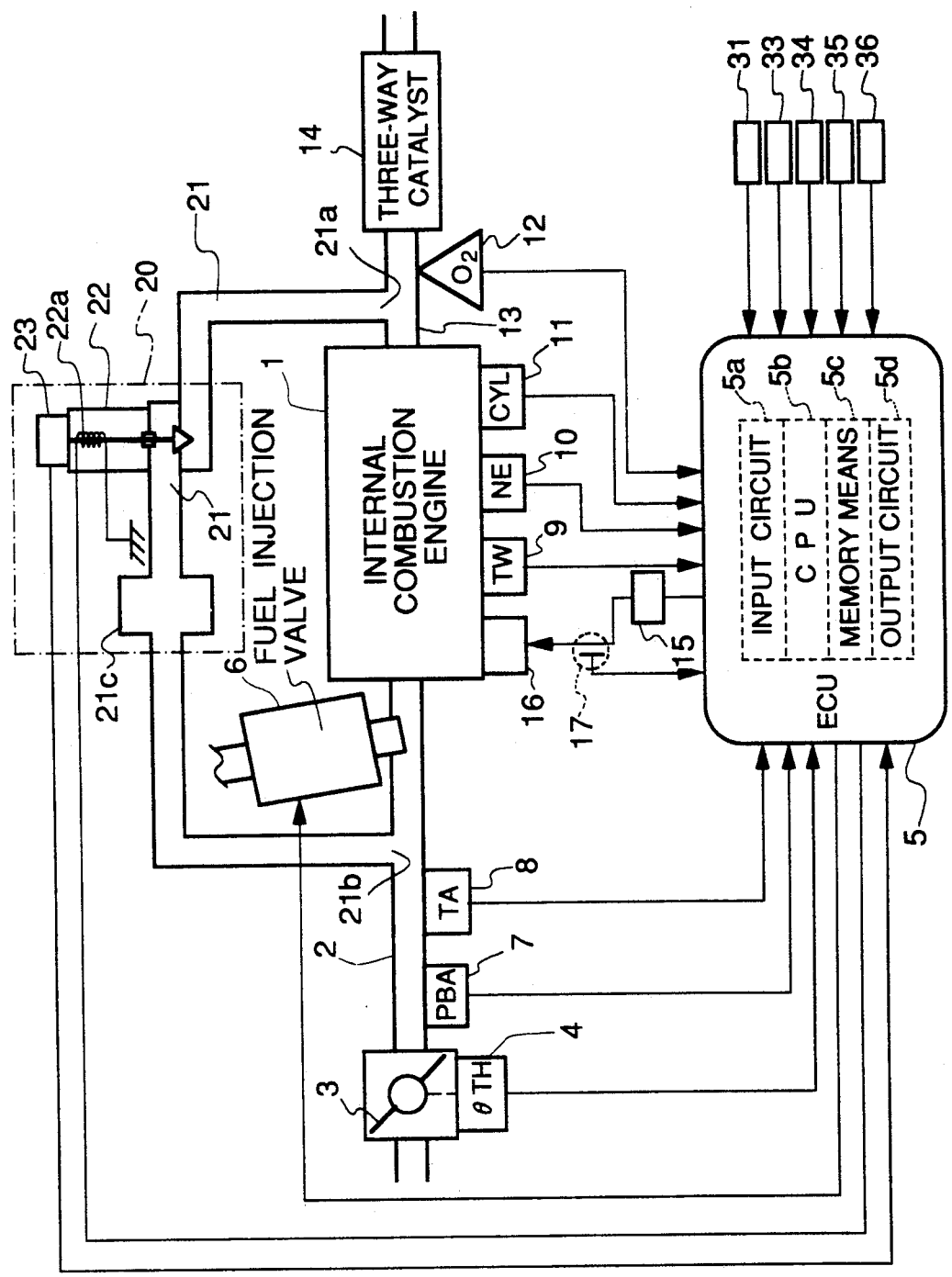
FIG. 14 is a block diagram showing the whole arrangement of an internal combustion engine and a control system therefor, according to a third embodiment of the invention.

FIG. 14 shows the whole arrangement of an internal combustion engine provided with an exhaust gas recirculation system and a control system therefor, according to the present embodiment, which is distinguished from that of the first embodiment shown in FIG. 1 in that an exhaust gas recirculation system 20 is additionally provided. Therefore, the exhaust gas recirculation system 20 will now be described.

This system 20 is comprised of an exhaust gas recirculation passage 21 having one end 21a thereof opening into the exhaust pipe 13 at a location upstream of the three-way catalyst 14 and the other end 21b thereof opening into the intake pipe 2 at a location downstream of the throttle valve 3. An exhaust gas recirculation valve 22 for controlling the flow rate of exhaust gases recirculated and a capacity chamber 21 are arranged in the exhaust gas recirculation passage 21. The exhaust gas recirculation valve 22 is formed by an electromagnetic valve having a solenoid 22a which is connected to the ECU 5 to have its opening linearly controlled by a control signal from the ECU 5. The exhaust gas recirculation valve 22 is provided with a lift sensor 23 for detecting the opening of the valve and supplying an electric signal indicative of the sensed opening of same to the ECU 5.

The ECU 5 determines operating conditions of the engine based on signals indicative of operating parameters of the engine supplied from the various sensors, and supplies a control signal to the solenoid 22a such that the difference between a command value LCMD of the opening of the exhaust gas recirculation valve 22 set according to the intake pipe absolute pressure PBA and the engine rotational speed NE and an actual value of the opening of the valve 22 is controlled to zero.

In the present embodiment, the CPU 5b calculates, based on the aforementioned engine operating parameter signals, a fuel injection period TOUT, an ignition timing advance value θIG, and the valve opening command value LCMD, by the use of the following equations (6) to (8):

$$TOUTn = TI \times KTDREn \times K1' + K2' \quad (6)$$

$$\theta IGn = \theta IGMAP + \theta IGDREn + IGCR \quad (7)$$

$$LCMD = LMAP \times KEDRE \times K3' \quad (8)$$

where the letter "n" designates the number of the cylinder subjected to the calculation, since the control parameters are calculated for each cylinder (e.g. in the case of a four-cylinder type engine, $TOUT_1$ to $TOUT_4$, and $\theta IG_1$ to $\theta IG_4$ are calculated).

TI, θIGMAP, and LMAP represent basic values of the fuel injection period TOUT, the ignition timing advance value θIG. and the valve opening command value LCMD, which are read from respective maps set such that optimum values thereof are provided correspondingly to values of the engine rotational speed NE and values of the intake pipe absolute pressure PBA, and stored in the memory means 5c.

KTDREn, θIGDREn and KEDRE represent a combustion roughness-dependent correction coefficient, combustion roughness-dependent correction variable, and a combustion roughness-dependent correction coefficient, respectively.

K1' and K3', and K2' and θIGCR are other correction coefficients and variables calculated based on various engine operating parameter signals.

The CPU 5b carries out the valve opening control of the exhaust gas recirculation valve 22 of the exhaust gas recirculation control system 20 and the traction control based on the driving wheel speeds WFL, WFR, and the trailing wheel speeds WRL, WRR, depending on operating conditions of the engine. The traction control is carried out such that the output torque from the engine is reduced by leaning the air-fuel ratio and interrupting the fuel supply (fuel cut) when an excessive slip state of the driving wheels is detected.

The CPU 5b supplies driving signals to the fuel injection valves 6, the spark plug 16 and the exhaust gas recirculation valve 22, based on results of the above calculations, via the output circuit 5d.

Figure 15A:
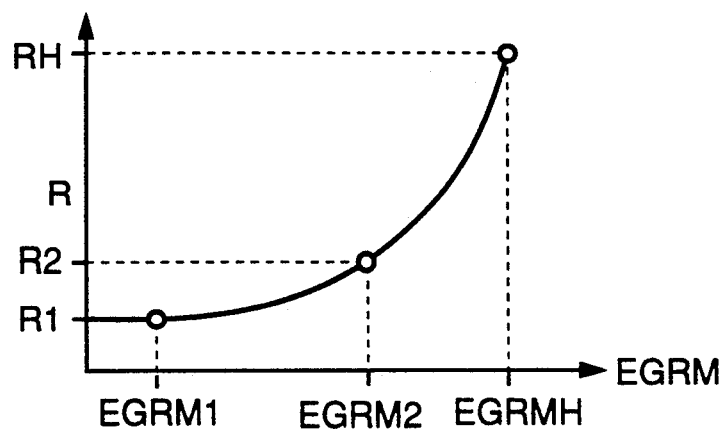
FIG. 15a is a diagram showing the relationship between an amount EGRM of exhaust gas recirculation and the combustion roughness R.
Figure 15B:
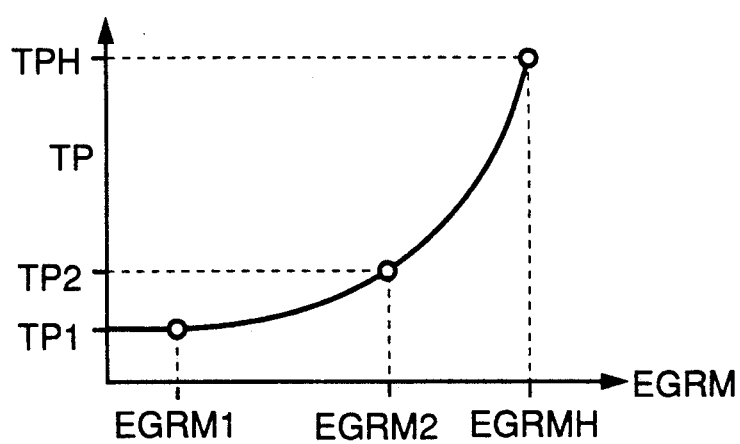
FIG. 15b is a diagram showing the relationship between the amount EGRM of exhaust gas recirculation and a duration TP of a comparison result pulse.
Figure 15C:
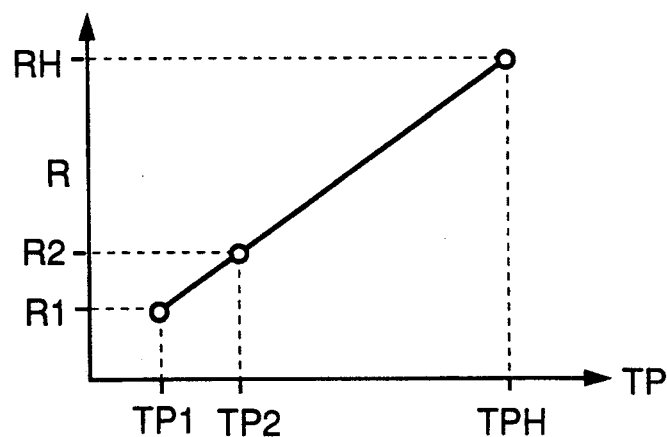
FIG. 15c is a diagram showing the relationship between the duration TP of the comparison result pulse and the combustion roughness R.

The present embodiment is based upon the recognition that the combustion roughness R defined before with reference to FIG. 5 varies in dependence on an amount EGRM of exhaust gas recirculation (hereinafter referred to as "the EGR amount"), in accordance with the relationship between the EGR amount EGRM and the combustion roughness R as in FIG. 15a. If the above relationship is related to the combustion roughness detecting arrangement of FIGS. 2-4, hereinbefore referred to, the relationship between the EGR amount EGRM and the duration TP of the comparison result pulse (from the time point t2 to the time point t4 in FIG. 4, or from the time point t1 to the time point t5 in FIG. 4) can be depicted as in FIG. 15b. In FIG. 15a and FIG. 15b, when EGRM=EGRMH, a misfire occurs (complete misfire as indicated by the broken lines in FIG. 4b and FIG. 4c), whereas when EGRM<EGRM1, good combustion occurs (as indicated by the solid lines in FIG. 4b and FIG. 4c). Therefore, in the range of EGRM1<EGRM<EGRMH, the relationship between the duration TP of the comparison result pulse and the combustion roughness R can be depicted as in FIG. 15c. Therefore, it is possible to detect or determine the combustion roughness R by measuring the duration TP of the comparison result pulse.

Figure 16:
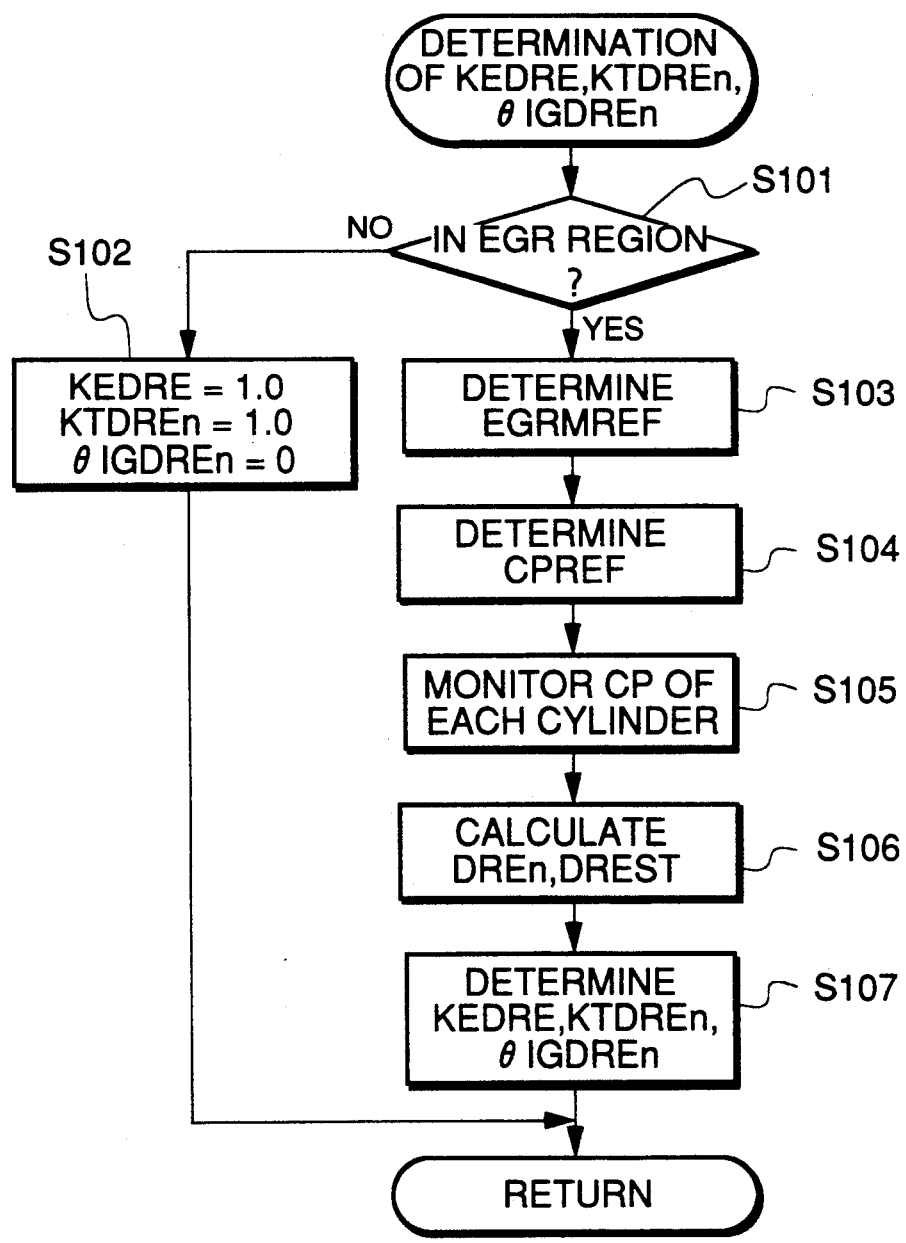
FIG. 16 is a flowchart of a program for determining combustion roughness-dependent correction coefficients KEDRE, KTDREn and a combustion roughness-dependent correction variable $\theta$IGDREn.

FIG. 16 shows a program for controlling the combustion roughness R based on the count value CP representative of the duration TP of the comparison result pulse, according to the present embodiment, which is executed in synchronism with generation of each TDC signal pulse.

At a step S101, it is determined whether or not the engine is in an operating region in which the exhaust gas recirculation should be carried out (hereinafter referred to as "the EGR region"). This determination is carried out by determining whether or not the detected engine rotational speed NE and the detected intake pipe absolute pressure PBA fall within respective predetermined ranges. If the answer to the question of the step S101 is negative (NO), i.e. if the engine is not in the EGR region, the combustion roughness-dependent correction coefficient KTDREn for use in calculating the fuel supply amount and the combustion roughness-dependent correction coefficient KEDRE for use in calculating the valve opening command value of the exhaust recirculation valve 22, i.e. the EGR amount, are both set to a value of 1.0, and at the same time the combustion roughness-dependent correction variable $\theta$IGDREn is set to a value of 0, at a step S102, followed by terminating the program. In short, if the engine is not in the EGR region, the combustion roughness control based on the count value CP is not carried out.

Figure 17:
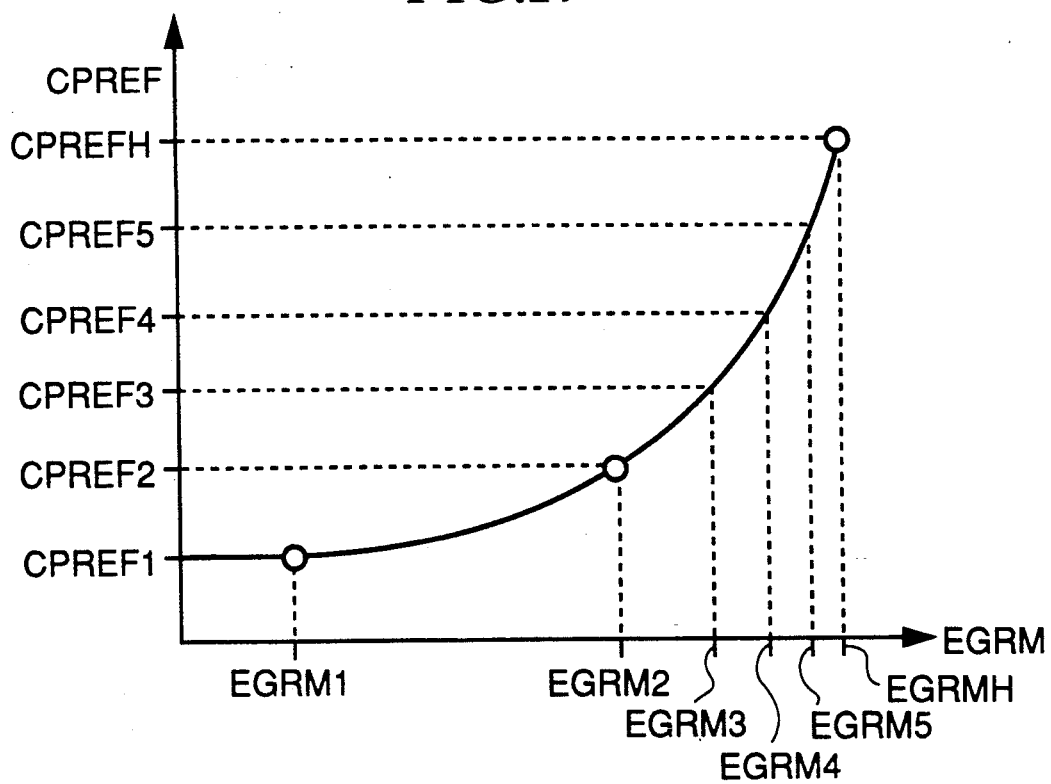
FIG. 17 is a table for determining a reference value CPREF.

If the answer to the question of the step S101 is affirmative (YES), i.e. if the engine is in the EGR region, a desired or reference EGR amount EGRMREF is determined depending on operating conditions of the engine, at a step S103, and then a reference value CPREF of the count value CP corresponding to the reference roughness RREF is determined by retrieving a CPREF table according to the desired EGR amount EGRMREF, at a step S104. The CPREF table is set, e.g. as shown in FIG. 17, based on the relationship between the EGR amount EGRM and the duration TP of the comparison result pulse.

At the following step S105, a newest or updated value of the count value CPn for each cylinder is read, and the difference DREn between the desired value CPREF and the count value CPn is calculated by the use of the following equation (9):

$$DREn = CPREF - CPn \qquad (9)$$

followed by determining a representative value DREST of the DREn value, based on the difference DREn.

The representative value DREST is a difference value representative of the state of combustion of the whole engine, but not of an individual cylinder. As the representative value DREST is used the DREn value of a cylinder of the engine which is most stable in combustion, or alternatively an average value of values DREn of all the cylinders. The cylinder which is most stable in combustion is determined e.g. by monitoring variation in the CP value for each cylinder when the engine is in a steady operating condition (e.g. idling).

At the following step S107, the correction coefficient KTDREn and the correction variable $\theta$IGDREn are determined based on the difference DREn, and the correction coefficient KEDRE is determined based on the representative DREST.

Figure 18A:
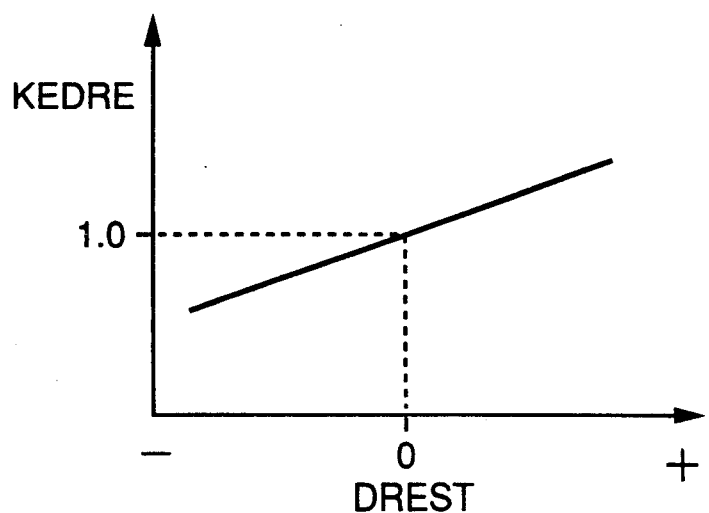
FIG. 18a is a diagram which is useful in explaining a manner of determining the combustion roughness-dependent correction coefficient KEDRE for EGR control.

The correction coefficient KEDRE for use in calculating the EGR amount is determined based on a KEDRE table, which is set, e.g. as shown in FIG. 18a. More specifically, according to the table, when DREST=0, the correction coefficient KEDRE is set to a value of 1.0 (non-correction value), and the KEDRE value increases as the DREST value increases.

Figure 18B:
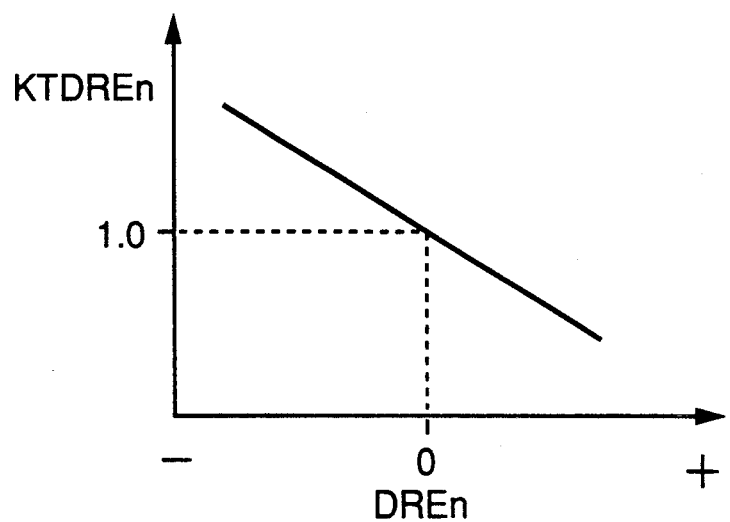
FIG. 18b is a diagram which is useful in explaining a manner of determining the combustion roughness-dependent correction coefficient KTDREn for fuel supply control.

The correction coefficient KTDREn for use in calculating the fuel supply amount is determined based on a KTDRE table, which is set, e.g. as shown in FIG. 18b. More specifically, according to the table, when DREn=0, the correction coefficient KTDREn is set to a value of 1.0 (non-correction value), and the KTDREn value decreases as the DREn value increases.

Figure 18C:
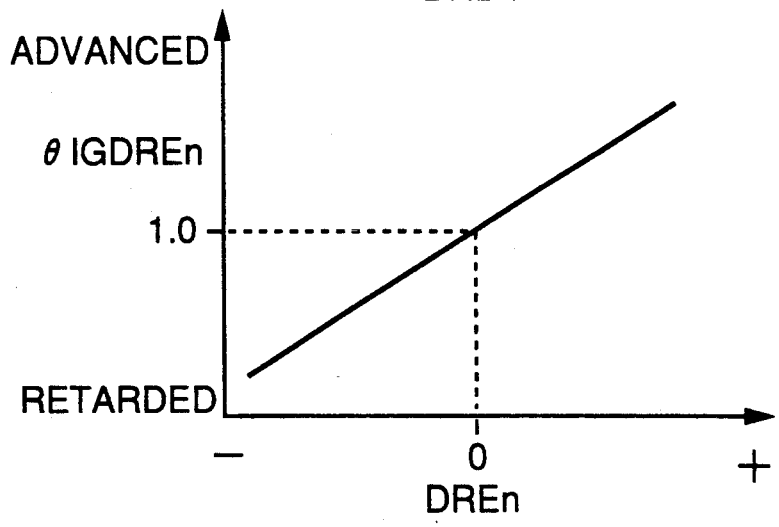
FIG. 18c is a diagram which is useful in explaining a manner of determining the combustion roughness-dependent correction variable $\theta$IGDREn.

The correction variable $\theta$IGDREn for use in calculating the ignition timing advance value is determined based on a $\theta$IGDRE table, which is set, e.g. as shown in FIG. 18c. More specifically, according to the table, when DREn=0, the correction variable $\theta$IGDREn is set to a value of 0 (non-correction value), and the $\theta$IGDREn value decreases as the DREn value increases.

According to the FIG. 16 program, the control parameters (LCMD, TOUTn, and $\theta$IGDREn) for the EGR amount, the fuel supply amount, and the ignition timing are corrected such that the detected combustion roughness R (i.e. the count value CP) becomes equal to the reference combustion roughness RREF (i.e. the reference value CPREF). More specifically, the EGR amount EGRM is controlled such that the representative value DREST becomes equal to 0. For example, assuming that the representative value DREST is formed by the DREn value of the cylinder which is most stable in combustion, the combustion roughness R of the same cylinder becomes equal to the reference combustion roughness RREF. On this occasion, if values of the combustion roughness R of the other cylinders are not equal to the reference roughness RREF, the fuel injection period or fuel supply amount TOUTn and the ignition timing advance value $\theta$IGn are controlled for each of the other cylinders such that the R values become equal to the reference combustion roughness RREF.

Thus, according to the present embodiment, the combustion roughness R (the count value CP) is determined, and the EGR amount is corrected in response to the determined combustion roughness R, which makes it possible to carry out the exhaust gas recirculation control to the utmost extent insofar as the drivability is not degraded, as well as to reduce the fuel consumption and improve exhaust gas emission characteristics.

Further, variations in the combustion roughness between the cylinders are reduced by correcting the fuel supply amount and the ignition timing for each cylinder, which contributes to reducing vibrations of the whole engine, and fluctuations in the engine rotational speed which would occur, e.g. when the engine is idling.

What is claimed is:

1. In a control system for an internal combustion engine having at least one cylinder, and a spark plug provided for each of said at least one cylinder, said control system including a control means for controlling operation of said engine according to combustion roughness, said control means including signal-generating means for determining ignition timing of said engine and for generating an ignition command signal indicative of the determined ignition timing, and igniting means responsive to said ignition command signal for generating high voltage for causing generation of sparking voltage across said at least one spark plug, the improvement comprising:

voltage value-detecting means coupled to said igniting means for detecting said sparking voltage generated across said at least one spark plug when said high voltage is generated;

duration-measuring means coupled to said voltage value-detecting means for measuring a duration over which said sparking voltage across said spark plug exceeds a predetermined reference value, after generation of said ignition command signal; and combustion roughness-detecting means coupled to said duration-measuring means and said control means for detecting said combustion roughness based on said duration measured.

2. A control system according to claim 1, wherein said control means controls said operation of said engine based on the detected combustion roughness.

3. A control system according to claim 2, wherein said control means controls at least one of an amount of fuel supplied to said engine and ignition timing of said engine, based on the detected combustion roughness.

4. A control system according to claim 2, wherein said engine includes an intake system and an exhaust gas recirculation system for recirculating exhaust gases from said engine to said intake system, said control means controlling an amount of exhaust gases recirculated by said exhaust gas recirculation system, based on the detected combustion roughness.

5. A control system according to claim 3 or 4, wherein said engine includes a plurality of cylinders, said control means controlling at least one of an amount of fuel supplied to said engine and ignition timing of said engine, for each of said cylinders, based on the detected combustion roughness.

6. In a control system for an internal combustion engine having at least one cylinder, and a spark plug provided for each of said at least one cylinder, said control system including control means for controlling operation of said engine according to an air-fuel ratio of an air-fuel mixture supplied to said engine, said control means including signal-generating means for determining ignition timing of said engine and for generating an ignition command signal indicative of the determined ignition timing ,and igniting means responsive to said ignition command signal for generating high voltage for causing generation of sparking voltage across said at least one spark plug, the improvement comprising:

voltage value-detecting means coupled to said igniting means for detecting said sparking voltage generated across said at least one spark plug when said high voltage is generated;

duration-measuring means coupled to said voltage value-detecting means for measuring a duration over which said sparking voltage across said spark plug exceeds a predetermined reference value, after generation of said ignition command signal; and air-fuel ratio-detecting means coupled to said duration-measuring means and said control means for detecting said air-fuel ratio of said fuel-fuel mixture supplied to said engine, based on said duration measured.

* * * * *